United States Patent
Aylward et al.

(10) Patent No.: US 7,087,351 B2
(45) Date of Patent: Aug. 8, 2006

(54) ANTISTATIC LAYER FOR ELECTRICALLY MODULATED DISPLAY

(75) Inventors: Peter T. Aylward, Hilton, NY (US); Debasis Majumdar, Rochester, NY (US); Hwei-Ling Yau, Rochester, NY (US); William J. Durkin, Webster, NY (US); Donald O. Bigelow, Honeoye Falls, NY (US); Daniel A. Slater, Rochester, NY (US); Kelly S. Robinson, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/953,623

(22) Filed: Sep. 29, 2004

(65) Prior Publication Data

US 2006/0068329 A1    Mar. 30, 2006

(51) Int. Cl.
*G03C 1/85* (2006.01)
*C09K 19/00* (2006.01)
*H01J 1/62* (2006.01)
*H01J 63/04* (2006.01)

(52) U.S. Cl. .................. 430/20; 430/527; 430/528; 430/529; 430/530; 313/504; 313/506; 428/1.1; 428/1.5; 428/1.6; 428/1.55

(58) Field of Classification Search ............... 430/20, 430/527, 528, 529, 530; 313/504, 506; 428/1.5, 428/1.6, 1.1, 1.55
See application file for complete search history.

(56) References Cited

U.S. PATENT DOCUMENTS

| 4,752,820 A * | 6/1988 | Kuroiwa et al. ............ 365/108 |
| 5,276,541 A * | 1/1994 | Terada et al. ............... 349/190 |
| 5,629,389 A * | 5/1997 | Roitman et al. ............ 525/534 |
| 5,844,363 A * | 12/1998 | Gu et al. ..................... 313/506 |
| 5,948,552 A * | 9/1999 | Antoniadis et al. ......... 428/690 |
| 6,066,442 A * | 5/2000 | Kurachi et al. ............. 430/530 |
| 6,197,486 B1 | 3/2001 | Majumdar et al. |
| 6,207,361 B1 | 3/2001 | Greener et al. |
| 6,570,325 B1 * | 5/2003 | Graff et al. ................. 313/506 |
| 6,602,790 B1 | 8/2003 | Kian et al. |
| 6,632,544 B1 * | 10/2003 | Kido et al. ................. 428/690 |
| 2002/0110673 A1 | 8/2002 | Heydarpour et al. |
| 2002/0197494 A1 * | 12/2002 | Kido et al. ............... 428/473.5 |
| 2003/0068466 A1 | 4/2003 | Mimura et al. |
| 2003/0092267 A1 | 5/2003 | Kian et al. |
| 2005/0042556 A1 * | 2/2005 | Louwet et al. .............. 430/502 |
| 2005/0064154 A1 * | 3/2005 | Aylward et al. ......... 428/195.1 |
| 2005/0122042 A1 * | 6/2005 | Kang et al. ................. 313/506 |

FOREIGN PATENT DOCUMENTS

| WO | 02/065204 A1 | 8/2002 |
| WO | 03/083523 A2 | 10/2003 |

OTHER PUBLICATIONS

Pending Patent Application 10/839,935 (Docket 86624 CIP) filed on May 6, 2004, entitled Transparent Invisible Conductive Grid by Aylward et al.

* cited by examiner

Primary Examiner—Richard L. Schilling
(74) Attorney, Agent, or Firm—Lynne M. Blank

(57) ABSTRACT

The present invention relates to a display comprising at least one substrate having at least one electrically modulated imaging layer thereon, at least one patterned electrically conductive layer, and at least one antistatic layer.

72 Claims, No Drawings

ANTISTATIC LAYER FOR ELECTRICALLY MODULATED DISPLAY

FIELD OF THE INVENTION

The present invention relates to antistatic and charge control layers on displays with an electrically modulated imaging layer to prevent static induced switching.

BACKGROUND OF THE INVENTION

The problem of controlling static charge during plastic web manufacturing and transport is well known. Generation and uncontrolled discharge of electrostatic charge can cause a number of serious problems including safety hazards. In the field of imaging, particularly photography and displays with an electrically modulated imaging layer, the accumulation of charge on surfaces leads to the attraction of dirt, which can produce physical defects. The discharge of accumulated charge during or after the application of the electrically modulated imaging layer or layer(s) can produce irregular switch patterns or "static marks" in the electrically modulated imaging layer. The static problems have been aggravated by increased sensitivity of new liquid crystals, increased coating machine speeds, and increased finishing operations. The charge generated during the coating process may accumulate during winding and unwinding operations, during transport through the coating or printing equipment and during finishing operations, such as slitting and spooling. Typical construction of displays with an electrically modulated imaging layer provide a clear flexible plastic web that is coated on one side with a highly conductive materials such as ITO and then coated with a liquid crystal layer that can change state upon the application of an electrical field. The flexible web used in most display applications may have a thickness of 3–7 mils and the side of the flexible web opposite the electrically modulated imaging layer does not have the capability to move or dissipate charge. When a web of this type is conveyed over rollers or through a roller nip, a residual charge is built up on the web. If the web is not grounded or sufficiently conductive, a charge will build up to the point where the surface can no longer hold the charge. If the electrical field is of sufficient level, it may cause the electrically modulated imaging layer to switch states (focal conic to planar or planar to focal conic) as a point source. The resulting web has a static induced mark that is in a different state than the surrounding background, creating a defect in the web. In many cases the switched portion of liquid crystal cannot be switched back easily.

It is generally known that electrostatic charge can be dissipated effectively by incorporating one or more electrically conductive "antistatic" layers into the support structure. The typical location of an antistatic layer is an external surface, which comes in contact with various transport rollers. For imaging elements, the antistatic layer is usually placed on the side of the support opposite the imaging layer. The imaging element may also have a dual system for control of static in which the resin-coated paper contains both ionically conductive salts and water, as well as a conductor on the outside of the backside resin layer.

A wide variety of electrically conductive materials can be incorporated into antistatic layers to produce a wide range of conductivities. These can be divided into two broad groups: (i) ionic conductors and (ii) electronic conductors. In ionic conductors, charge is transferred by the bulk diffusion of charged species through an electrolyte. Here, the electrical resistivity of the antistatic layer is dependent on temperature and humidity. Antistatic layers containing simple inorganic salts, alkali metal salts of surfactants, ionic conductive polymers, polymeric electrolytes containing alkali metal salts, and colloidal metal oxide sols (stabilized by metal salts), described previously in patent literature, fall in this category. However, many of the inorganic salts, polymeric electrolytes, and low molecular weight surfactants used are water-soluble and are leached out of the antistatic layers during processing, resulting in a loss of antistatic function. The conductivity of antistatic layers employing an electronic conductor depends on electronic mobility, rather than ionic mobility, and is independent of humidity. Antistatic layers which contain conjugated polymers, semiconductive metal halide salts, and semiconductive metal oxide particles, have been described previously. However, these antistatic layers typically contain a high volume percentage of electronically conducting materials, which are often expensive and impart unfavorable physical characteristics, such as color, increased brittleness, and poor adhesion to the antistatic layer.

A vast majority of the prior art involves the coating of antistatic layers from aqueous or organic solvent based coating compositions. For photographic paper, typically, antistatic layers based on ionic conductors are coated out of aqueous and/or organic solvent based formulations, which necessitates an effective elimination of the solvent. Under fast drying conditions, as dictated by efficiency, formation of such layers may pose some problems. An improper drying will invariably cause coating defects and inadequate adhesion and/or cohesion of the antistatic layer, generating waste or inferior performance. Poor adhesion or cohesion of the antistatic layer can lead to unacceptable dusting and track-off. A discontinuous antistatic layer, resulting from dusting, flaking, or other causes, may exhibit poor conductivity, and may not provide necessary static protection. Improper drying can also allow leaching of calcium stearate from the paper support into the processing tanks, causing build-up of stearate sludge. Flakes of the antistatic backing in the processing solution can form soft tar-like species, which, even in extremely small amounts, can re-deposit as smudges on drier rollers, eventually transferring to image areas of the photographic paper, creating unacceptable defects. Moreover, the majority of conductive materials used as antistats on current photographic paper products lose their electrical conductivity after photographic processing due to their ionic nature. This can cause print sticking after drying in the photo processor, and/or in a stack. Other imaging elements that are on resin coated paper bases have a dual system for control of static in which the paper contains both ionically conductive salts and water as well as a conductor on the outside of the backside resin layer.

In U.S. Pat. Nos. 6,197,486 and 6,207,361, antistatic layers have been disclosed, which can be formed through the (co)-extrusion method, thus eliminating the need to coat the support in a separate step and rendering the manufacturing process less costly.

With the development of all plastic web media, such as, for example, foam-core polymer sheets, the conductivity requirements of the plastic web media are typically increased because there is no paper base that contains water and salt to provide conductivity. The web media may require the addition of an electronically conducting material such as tin oxide, polythiophene and others. Some of these materials have color associated with them at various coverages. These materials are also very expensive when compared to more conventional conductive compounds.

PROBLEM TO BE SOLVED

There remains a need for conductive materials that can be used in electrical modulated displays to prevent unwanted and uncontrolled changes that are the result of static buildup.

SUMMARY OF THE INVENTION

The present invention relates to a display comprising at least one substrate having at least one electrically modulated imaging layer thereon, at least one patterned electrically conductive layer, and at least one antistatic layer.

ADVANTAGEOUS EFFECT OF THE INVENTION

The present invention includes several advantages, not all of which are incorporated in a single embodiment. The inclusion of an antistatic layer with sufficient conductivity and in an electrically modulated imaging element is essential to prevent uncontrolled localized static buildup that can cause electrically modulated imaging layers to switch states. The present invention may also provide additional benefits in friction control, scratch resistances, light stability of liquid crystals, less unwanted dirt and improved transport through finishing and cutting equipment.

DETAILED DESCRIPTION OF THE INVENTION

The present invention relates to a display comprising a substrate or substrate having an electrically modulated imaging layer thereon, a patterned electrically conductive layer, and at least one antistatic layer. The antistatic layer may optionally comprise a polymeric binder or carrier for improved optical and physical properties. The display may be stacked to produce a multilayer, potentially multicolor, display.

The terms as used herein, "liquid crystal side", and "face" mean the side or toward the side of the display bearing the electrically modulated imaging layer. The terms "bottom", "back" or "view" side mean the side or toward the side of the display opposite from the side bearing the electrically modulated imaging layer and closest to the viewer and through which the viewer views the display. The "electrically modulated imaging side" of the substrate is the side on which liquid crystal would be applied. The "non-electrically modulated imaging side" of the substrate is the side of substrate opposite the electrically modulated imaging layer. The terms "top" or "upper" mean the side or toward the side farthest from the viewer or viewing plane.

The antistatic layer of the present invention comprises an electrically conductive antistatic material and may include ionic conductors and electrically conductive antistatic materials. The conductive antistatic material, when utilized in an antistatic layer, preferably produces an antistatic layer having an electrical resistivity of less than $10^{13}$ ohm/square, most preferably, a resistivity less than $3 \times 10^{12}$ ohm/square. In a preferred embodiment, the resistivity of the antistatic layer ranges between $10^{12}$ and $10^4$ ohms/sq. Above $10^{12}$, the antistatic layer typically does not provide sufficient conduction of charge to prevent charge accumulation to the point of preventing fog in photographic systems or from unwanted point switching in liquid crystal displays. While layers greater than $10^5$ will prevent charge buildup, most antistatic materials are inherently not that conductive and in those materials that are more conductive than $10^5$, there is the possibility that the antistatic layer could undesirably switch the state of the electrically modulated material. The antistatic layer is separate from the highly conductive layer of ITO and provides the best static control when it is on the opposite side of the web substrate from that of the ITO layer. This may include the web substrate itself. The antistatic layer according to the present invention, which preferably relates to matrix addressable or pixilated displays, should not be capable of switching the electrically modulated layer.

Electrically conductive antistatic materials, such as conjugated conducting polymers, conducting carbon particles, crystalline semiconductor particles, amorphous semiconductive fibrils, and continuous conductive metal or semiconducting thin films may be used in this invention to afford humidity independent, process-surviving antistatic protection. Of the various types of electrically conductive antistatic materials, electronically conductive metal-containing particles, such as semiconducting metal oxides, and electronically conductive polymers, such as, substituted or unsubstituted polythiophenes, substituted or unsubstituted polypyrroles, and substituted or unsubstituted polyanilines are particularly effective for the present invention.

Conductive metal-containing particles, which may be used in the present invention include conductive crystalline inorganic oxides, conductive metal antimonates, and conductive inorganic non-oxides. Crystalline inorganic oxides may be chosen from zinc oxide, titania, tin oxide, alumina, indium oxide, silica, magnesia, barium oxide, molybdenum oxide, tungsten oxide, and vanadium oxide or composite oxides thereof, as described in, for example, U.S. Pat. Nos. 4,275,103, 4,394,441, 4,416,963, 4,418,141, 4,431,764, 4,495,276, 4,571,361, 4,999,276 and 5,122,445, all incorporated herein by reference.

The conductive crystalline inorganic oxides may contain a "dopant" in the range from 0.01 to 30 mole percent. Preferred dopants may include aluminum or indium for zinc oxide, niobium or tantalum for titania, and antimony, niobium or halogens for tin oxide. Alternatively, the conductivity can be enhanced by formation of oxygen defects by methods well known in the art. The use of antimony-doped tin oxide particles, such as those having an X-ray crystallite size less than 100 Å and an average equivalent spherical diameter less than 15 nm but no less than the X-ray crystallite size as taught in U.S. Pat. No. 5,484,694 incorporated herein by reference, is specifically contemplated.

Particularly useful electronically conductive metal-containing antistatic particles, which may be used in the antistatic layer, include acicular-doped metal oxides, acicular metal oxide particles, and acicular metal oxides containing oxygen deficiencies. In this category, acicular-doped tin oxide particles, particularly acicular antimony-doped tin oxide particles, acicular niobium-doped titanium dioxide particles, are preferred because of their availability. The aforesaid acicular conductive particles preferably have a cross-sectional diameter less than or equal to 0.02 μm and an aspect ratio greater than or equal to 5:1. Some of these acicular conductive particles, useful for the present invention, are described in U.S. Pat. Nos. 5,719,016, 5,731,119, 5,939,243 and references therein, all incorporated herein by reference.

The volume fraction of the acicular electronically conductive metal oxide particles in the dried antistatic layer of the invention may vary from 1 to 70% and preferably from 5 to 50% for optimum physical properties. For non-acicular electronically conductive metal oxide particles, the volume fraction may vary from 15 to 90%, and preferably from 20 to 80% for optimum properties.

The invention is also applicable where the conductive antistatic agent comprises a conductive "amorphous" gel such as vanadium oxide gel comprised of vanadium oxide ribbons or fibers. Such vanadium oxide gels may be prepared by any variety of methods, including but not specifically limited to melt quenching as described in U.S. Pat. No. 4,203,769, ion exchange as described in DE 4,125,758, or hydrolysis of a vanadium oxoalkoxide as claimed in WO 93/24584 all incorporated herein by reference. The vanadium oxide gel is preferably doped with silver to enhance conductivity. Other methods of preparing vanadium oxide gels, which are well known in the literature, include reaction of vanadium or vanadium pentoxide with hydrogen peroxide and hydrolysis of $VO_2$ OAc or vanadium oxychloride.

Conductive metal antimonates suitable for use in accordance with the invention include those as disclosed in, U.S. Pat. No. 5,368,995 incorporated herein by reference and U.S. Pat. No. 5,457,013 incorporated herein by reference, for example. Preferred conductive metal antimonates have a rutile or rutile-related crystallographic structures and may be represented as $M^{+2} Sb^{+5}_2 O_6$ (where $M^{+2} = Zn^{+2}, Ni^{+2}, Mg^{+2}, Fe^{+2}, Cu^{+2}, Mn^{+2}, Co^{+2}$) or $M^{+3} Sb^{+5} O_4$ (where $M^{+3} = In^{+3}, Al^{+3}, Sc^{+3}, Cr^{+3}, Fe^{+3}$). Several colloidal conductive metal antimonate dispersions are commercially available from Nissan Chemical Company in the form of aqueous or organic dispersions. Alternatively, U.S. Pat. Nos. 4,169,104 and 4,110,247 incorporated herein by reference teach a method for preparing $M^{+2}Sb^{+5}_2O_6$ by treating an aqueous solution of potassium antimonate with an aqueous solution of an appropriate metal salt (for example, chloride, nitrate, sulfate) to form a gelatinous precipitate of the corresponding insoluble hydrate which may be converted to a conductive metal antimonate by suitable treatment. If used, the volume fraction of the conductive metal antimonates in the dried antistatic layer can vary from 15 to 90%. But it is preferred to be from 20 to 80% for optimum physical properties.

Conductive inorganic non-oxides suitable for use as conductive antistatic particles in the present invention include metal nitrides, metal borides and metal silicides, which may be acicular or non-acicular in shape. Examples of these inorganic non-oxides include titanium nitride, titanium boride, titanium carbide, niobium boride, tungsten carbide, lanthanum boride, zirconium boride, or molybdenum boride. Examples of conductive carbon particles include carbon black and carbon fibrils or nanotubes with single walled or multi-walled morphology. Example of such suitable conductive carbon particles can be found in U.S. Pat. No. 5,576,162 and references therein incorporated herein by reference.

Suitable electrically conductive antistatic polymers that are preferred for incorporation in the antistatic layer of the invention are specifically electronically conducting polymers, such as those illustrated in U.S. Pat. Nos. 6,025,119, 6,060,229, 6,077,655, 6,096,491, 6,124,083, 6,162,596, 6,187,522, and 6,190,846 incorporated herein by reference. These electronically conductive polymers include substituted or unsubstituted aniline-containing polymers (as disclosed in U.S. Pat. Nos. 5,716,550, 5,093,439 and 4,070,189 incorporated herein by reference), substituted or unsubstituted thiophene-containing polymers (as disclosed in U.S. Pat. Nos. 5,300,575, 5,312,681, 5,354,613, 5,370,981, 5,372,924, 5,391,472, 5,403,467, 5,443,944, 5,575,898, 4,987,042 and 4,731,408 incorporated herein by reference), substituted or unsubstituted pyrrole-containing polymers (as disclosed in U.S. Pat. Nos. 5,665,498 and 5,674,654 incorporated herein by reference), and poly(isothianaphthene) or derivatives thereof. These conducting polymers may be soluble or dispersible in organic solvents or water or mixtures thereof. Preferred conducting polymers for the present invention include polypyrrole styrene sulfonate (referred to as polypyrrole/poly (styrene sulfonic acid) in U.S. Pat. No. 5,674,654 incorporated herein by reference), 3,4-dialkoxy substituted polypyrrole styrene sulfonate, and 3,4-dialkoxy substituted polythiophene styrene sulfonate because of their color. The most preferred substituted electronically conductive polymers include poly(3,4-ethylene dioxythiophene styrene sulfonate), such as Baytron® P supplied by Bayer Corporation, for its apparent availability in relatively large quantity. The weight % of the conductive polymer in the dried antistatic layer of the invention may vary from 1 to 99% but preferably varies from 2 to 30% for optimum physical properties.

Humidity dependent, ionic conductors are traditionally more cost-effective than electronic conductors and find widespread use in reflective imaging media such as paper. Any such ionic conductor can be incorporated as an antistatic material in the antistatic layer of the invention. The ionic conductors can comprise inorganic and/or organic salt. Alkali metal salts, particularly those of polyacids, may be effective. The alkali metal can comprise lithium, sodium or potassium and the polyacid can comprise polyacrylic or polymethacrylic acid, maleic acid, itaconic acid, crotonic acid, polysulfonic acid or mixed polymers of these compounds, as well as cellulose derivatives. The alkali salts of polystyrene sulfonic acid, napthalene sulfonic acid or an alkali cellulose sulfate are preferred for their performance.

The combination of polymerized alkylene oxides and alkali metal salts, described in U.S. Pat. Nos. 4,542,095 and 5,683,862, incorporated herein by reference, is also a preferred choice. Specifically, a combination of a polyethylene ether glycol and lithium nitrate is a desirable choice because of its performance and cost. Also, preferred are inorganic particles such as electrically conductive synthetic or natural smectite clay. Of particular preference for application in the present invention are those ionic conductors, such as an alkali metal salt in combination with a polymeric latex binder and a non-ionic surface-active compound containing, as described in U.S. Pat. No. 5,683,862 incorporated herein by reference, a smectite clay in combination with an interpolymer of vinylidene halide, as described in U.S. Pat. No. 5,869,227 incorporated herein by reference, a smectite clay, and a polymeric binder wherein the polymeric binder can sufficiently intercalate inside or exfoliate the smectite clay, as described in U.S. Pat. No. 5,891,611 incorporated herein by reference, a smectite clay, a first polymeric binder which sufficiently intercalates inside or exfoliates the smectite clay and a second polymeric binder which does not sufficiently intercalate inside or exfoliate the smectite clay, as described in U.S. Pat. No. 5,981,126 incorporated herein by reference, a combination of an alkali metal salt and a polymerized alkylene oxide, a positively charged colloidal oxide sol and a film forming binder which is an interpolymer of a primary amine addition salt with a peel strength of 200 g or above on a polyolefin surface, as described in U.S. Pat. No. 6,077,656 incorporated herein by reference, and a combination of an alkali metal salt and a polymerized alkylene oxide, colloidal silica, preferably aluminum modified colloidal silica, and a polymeric film-forming binder with a peel strength of 200 g or above on a polypropylene surface, as described in U.S. Pat. No. 6,171,769, and references therein incorporated herein by reference.

Another suitable group of polymeric conductive materials, which are well known in the art for their excellent melt-processabilty while retaining their antistatic property and overall physical performance, may include polyether based polymeric antistatic compounds containing polyalkoxylated compounds. These materials can include various polymeric substances containing polyether blocks such as polyethylene oxides, polypropylene oxides, polybutylene oxides, polytetramethylene oxides, polyoxyalkylene glycols such as polyoxyethylene glycol, polyoxypropylene glycol, polyoxytetramethylene glycol, the reaction products of polyalkoxylates with fatty acids, the reaction products of polyalkoxylates with fatty alcohols, the reaction products of polyalkoxylates with fatty acid esters of polyhydroxyl alcohols (for instance polyalkoxylate reaction products of fatty acids, of fatty glycols, of fatty sorbitols, of fatty sorbitans, and of fatty alcohols), or, interpolymers and/or mixtures thereof. The polyether chains in the suitable polyalkoxylated compounds are of the formula $(-OC_xH_{2x}-)_n$ wherein x is from 2 to 8, wherein the alkyl group is straight or branched, and wherein n is from 2 to 1000. It is believed that ionic conduction along the polyether chains makes these polymers inherently dissipative, yielding resistivities in the range $10^8$–$10^{13}$ ohm/square.

For the purpose of this invention, any polyalkoxylated compounds containing oligomer, homopolymer, interpolymer and/or mixtures thereof can suitably be used in this invention. However, preferred examples of such polyether polymeric conductive materials are those comprising polyamide blocks and polyether block(s), such as polyether block copolyamide, and, for example, as disclosed in U.S. Pat. Nos. 4,331,786, 4,115,475, 4,195,015, 4,839,441, 4,864,014, 4,230,838, 4,332,920, 6,197,486, 6,207,361, 6,436,619, 6,465,140 and 6,566,033 and product literature for Pebax supplied by Elf Atochem or Irgastat currently supplied by Ciba Specialty Chemicals, polyetheresteramides, for example, as disclosed in U.S. Pat. Nos. 5,604,284; 5,652,326; 5,886,098, and thermoplastic polyurethanes containing a polyalkylene glycol moiety, for example, as disclosed in U.S. Pat. Nos. 5,159,053; 5,863,466, with the content of all of the aforementioned literature incorporated herein by reference. Most preferred polyether polymeric conductive compounds used as antistats are those comprising polyamide blocks and polyether block(s).

Surfactants capable of static dissipation are also suitable for application as antistatic materials in the present invention. Such surfactants are usually highly polar compounds and can be anionic, cationic or non-ionic or mixtures thereof, as described in U.S. Pat. No. 6,136,396 herein incorporated by reference. Examples of anionic surfactants include compounds such as those comprising alkyl sulfates, alkyl sulfonates and alkyl phosphates having alkyl chains of 4 or more carbon atoms in length. Examples of cationic surfactants include compounds such as onium salts, particularly quaternary ammonium or phosphonium salts, having alkyl chains of 4 or more carbon atoms in length. Examples of non-ionic surfactants include compounds such as polyvinyl alcohol, polyvinylpyrrolidone and polyethers, as well as amines, acids and fatty acid esters having alkyl groups of 4 or more carbon atoms in length. Surfactants can also be effectively used for charge balancing, as per the present invention. In this case, suitable surfactants are chosen to counter balance the that would develop on the surface from contact with other surfaces.

The conductive particles that can be incorporated in the antistatic layer are not specifically limited in particle size or shape. The particle shape may range from roughly spherical or equiaxial particles to high aspect ratio particles such as fibers, whiskers, tubes, platelets or ribbons. Additionally, the conductive materials described above may be coated on a variety of other particles, also not particularly limited in shape or composition. For example the conductive inorganic material may be coated on non-conductive silica, alumina, titania and mica particles, whiskers or fibers.

In one embodiment, the antistatic material may be transparent or otherwise invisible to the human eye. For a particular conductive antistatic material not visible to the human eye under daylight illuminance, there is a specific wavelength range of absorptivity and reflectance. The source of illuminance is matched to the absorptivity of the conductive materials and a detector is matched to its reflectivity. The conductive materials may be added to inks. Examples of solvent based inks include nitrocellulose maleic, nitrocellulose polyamide, nitrocellulose acrylic, nitrocellulose urethane, chlorinated rubber, vinyl, acrylic, alcohol soluble acrylic, cellulose acetate acrylic styrene, and other synthetic polymers. Examples of water-based inks include acrylic emulsion, maleic resin dispersion styrene-maleic anhydride resins, and other synthetic polymers. Examples of radiation-cured inks include ultraviolet and electron beam inks. The preferred ink systems for printing of conductive antistatic materials are water based inks and radiation cured inks, because of the need to reduce volatile organic compounds associated with solvent based ink systems. Inks not visible to the human eye under daylight illuminance, as they are transparent, may be applied to the backside film support substrate without altering the physical appearance of any designs on the support. It may be necessary in some formulations to adjust the refractive index of the antistatic layer or the base to more closely match each other. In this manner the degree of perception of the conductive materials used as an antistatic will be minimized. Any material capable of adjusting the refractive index may be used to make the adjustment. These may include the selection of polymer binder, or the addition of nano particles such as ZnO, TiO2, clays, fluropolymers and others.

The conductive antistatic material may be applied to the substrate as is or it may be dispersed in a carrier material. The antistatic layer of the invention is preferred to comprise a colloidal sol, which may or may not be electrically conductive, to improve physical properties such as durability, roughness, coefficient of friction, as well as to reduce cost. The colloidal sol preferred in the present invention comprises finely divided inorganic particles in a liquid medium, preferably water. Most preferably the inorganic particles are metal oxide based. Such metal oxides include tin oxide, titania, antimony oxide, zirconia, ceria, yttria, zirconium silicate, silica, alumina, such as boehmite, aluminum modified silica, as well as other inorganic metal oxides of Group III and IV of the Periodic Table and mixtures thereof. The selection of the inorganic metal oxide sol is dependent on the ultimate balance of properties desired, as well as cost. Inorganic particles such as silicon carbide, silicon nitride and magnesium fluoride, when in sol form, are also useful for the present invention. The inorganic particles of the sol have an average particle size less than 100 nm, preferably less than 70 nm and most preferably less than 40 nm. A variety of colloidal sols useful in the present invention are commercially available from DuPont, Nalco Chemical Co., and Nyacol Products Inc.

The weight percent of the inorganic particles of the aforesaid sol are preferred to be at least 5% and more preferred to be at least 10% of the dried antistatic layer of the invention to achieve the desired physical properties.

The antistatic layer of the invention may also include a suitable polymeric carrier, also referred to herein as a binder, to achieve physical properties such as adhesion, abrasion resistance, backmark retention and others. Polymers are often used to promote adhesion of the conductive material to a base substrate or support material. They may also be useful in providing sufficient volume or bulk to make the coating or printing method work within it design range. Polymers may also provide enhanced functionality to the antistatic layer such as scratch or abrasion resistance, proper sliding friction to optimize coefficient of friction and other uses. The polymeric binder or carrier can be any polymer, depending on the specific need. The carrier or binder polymer can be one or more of a water-soluble polymer, a hydrophilic colloid or a water insoluble polymer, latex or dispersion. Particular preference is given to polymers selected from the group of polymers and interpolymers prepared from ethylenically unsaturated monomers such as styrene, styrene derivatives, acrylic acid or methacrylic acid and their derivatives, olefins, chlorinated olefins, (meth)acrylonitriles, itaconic acid and its derivatives, maleic acid and its derivatives, vinyl halides, vinylidene halides, vinyl monomer having a primary amine addition salt, vinyl monomer containing an aminostyrene addition salt and others. Also included are carrier polymers such as polyurethanes and polyesters. Particularly preferred carrier or binder polymers are polymeric film-forming binder having a peel strength of 200 g or greater on a polypropylene surface, as disclosed in U.S. Pat. No. 6,171,769 incorporated herein by reference, or polymeric film-forming binders of an interpolymer of a primary amine addition salt, having a peel strength of 200 g or greater, as disclosed in U.S. Pat. No. 6,077,656 incorporated herein by reference, because of their excellent adhesion characteristics. Typically, the conductive material may comprise from 15 to 85% weight of the antistatic layer. The carrier polymer may preferably comprise from 15 to 85% by weight of the antistatic layer.

If formed by thermal means, the polymeric binder or carrier may be any of the thermally processable polymers disclosed in U.S. Pat. Nos. 6,197,486, 6,197,486, 6,207,361, 6,436,619, 6,465,140, 6,566,033, incorporated herein by reference. Suitable classes of thermoplastic polymers preferred for this invention can include polymers of alpha-beta unsaturated monomers, polyesters, polyamides, polycarbonates, cellulosic esters, polyvinyl resins, polysulfonamides, polyethers, polyimides, polyurethanes, polyphenylenesulfides, polytetrafluoroethylene, polyacetals, polysulfonates, polyester ionomers, and polyolefin ionomers. Interpolymers and/or mixtures of these polymers can also be used. Illustrative of polymers of alpha-beta unsaturated monomers, which are suitable for use in this invention, include polymers of ethylene, propylene, hexene, butene, octene, vinylalcohol, acrylonitrile, vinylidene halide, salts of acrylic acid, salts of methacrylic acid, tetrafluoroethylene, chlorotrifluoroethylene, vinyl chloride, and styrene. Interpolymers and/or mixtures of these aforementioned polymers can also be used in the present invention. Most preferred polymers from this category include polyethylene, polypropylenes and polystyrenes together with their interpolymers and/or mixtures, because of their cost and mechanical properties.

Polyesters which are suitable for use as carrier polymers in this invention may include those which are derived from the condensation of aromatic, cycloaliphatic, and aliphatic diols with aliphatic, aromatic and cycloaliphatic dicarboxylic acids and may be cycloaliphatic, aliphatic or aromatic polyesters. Useful cycloaliphatic, aliphatic and aromatic polyesters, which can be utilized in the practice of their invention, may include poly(ethylene terephthalate), poly (cyclohexlenedimethylene), terephthalate) poly(ethylene dodecate), poly(butylene terephthalate), poly(ethylene naphthalate), poly(ethylene(2,7-naphthalate)), poly(methaphenylene isophthalate), poly(glycolic acid), poly(ethylene succinate), poly(ethylene adipate), poly(ethylene sebacate), poly(decamethylene azelate), poly(ethylene sebacate), poly (decamethylene adipate), poly(decamethylene sebacate), poly(dimethylpropiolactone), poly(para-hydroxybenzoate), poly(ethylene oxybenzoate), poly(ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly (1,4-cyclohexylene dimethylene terephthalate) (cis), and poly(1,4-cyclohexylene dimethylene terephthalate (trans).

Polyester compounds prepared from the condensation of a diol and an aromatic dicarboxylic acid are preferred for use in this invention. Useful aromatic carboxylic acids may include terephthalic acid, isophthalic acid and a o-phthalic acid, 1,3-napthalenedicarboxylic acid, 1,4 napthalenedicarboxylic acid, 2,6-napthalenedicarboxylic acid, 2,7-napthalenedicarboxylic acid, 4,4'-diphenyldicarboxylic acid, 4,4'-diphenysulfphone-dicarboxylic acid, 1,1,3-trimethyl-5-carboxy-3-(p-carboxyphenyl)-idane, diphenyl ether 4,4'-dicarboxylic acid, and bis-p(carboxy-phenyl) methane. Of the aforementioned aromatic dicarboxylic acids, those based on a benzene ring (such as terephthalic acid, isophthalic acid, orthophthalic acid) are preferred. Terephthalic acid is a particularly preferred acid precursor.

Most preferred polyesters may include poly(ethylene terephthalate), poly(butylene terephthalate), poly(1,4-cyclohexylene dimethylene terephthalate), poly(ethylene naphthalate) and interpolymers and/or mixtures thereof. Among these polyesters of choice, poly(ethylene terephthalate), which may be modified by small amounts of other monomers, is most preferred.

Polyamides, which are suitable for use as carrier polymers in this invention, may include synthetic linear polycarbonamides characterized by the presence of recurring carbonamide groups as an integral part of the polymer chain, which are separated from one another by at least two carbon atoms. Polyamides of this type include polymers, generally known in the art as nylons, obtained from diamines and dibasic acids having the recurring unit represented by the general formula:

—NHCOR¹COHNR²— in which $R^1$ is an alkylene group of at least 2 carbon atoms, preferably from 2 to 11 or arylene having at least 6 carbon atoms, preferably 6 to 17 carbon atoms; and $R^2$ is selected from $R^1$ and aryl groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6, 10), poly(hexamethylene isophthalamide), poly (hexamethylene terephthalamide), poly(heptamethylene pimelamide) (nylon 7,7), poly(octamethylene suberamide) (nylon 8,8), poly(nonamethylene azelamide) (nylon 9,9) poly(decamethylene azelamide) (nylon 10,9), poly(decamethylene sebacamide) (nylon 10,10), poly(bis(4-amino cyclohexyl)methane-1,10-decane-carboxamide)), poly(m-xylylene adipamide), poly(p-xylene sebacamide), poly(2,2, 2-trimethyl hexamethylene terephthalamide), poly(piperazine sebacamide), poly(p-phenylene terephthalamide), and poly(metaphenylene isophthalamide).

Other useful polyamides are those formed by polymerization of amino acids and derivatives thereof, as for example, lactams. Useful polyamides may include poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-amino-decanoic acid) (nylon 10), poly (11-aminoundecanoic acid) (nylon 11), and poly(12-aminododecanoic acid) (nylon 12). The most preferred polyamides include poly(caprolactam), poly(12-aminododecanoic acid), poly(hexamethylene adipamide), poly(m-xylylene adipamide), poly(6-aminohexanoic acid), and interpolymers and/or mixtures thereof.

Suitable cellulose esters may include cellulose nitrate, cellulose triacetate, cellulose diacetate, cellulose acetate propionate, cellulose acetate butyrate, and interpolymers and/or mixtures thereof. A polycarbonate preferred for use in this invention is bisphenol-A polycarbonate. Useful polyvinyl resins may include polyvinyl chloride, poly (vinyl acetal) and interpolymers and/or mixtures thereof.

The antistatic layer of the invention may include other optional components. Such optional components may include compatibilizers, nucleating agents, fillers, plasticizers, impact modifiers, chain extenders, colorants, lubricants, surfactants and coating aids, other antistatic conductive agents, onium salts, pigments such as titanium oxide, zinc oxide, talc, calcium carbonate, barium sulfate, clay, dispersants such as fatty amides, (for example, stearamide), metallic salts of fatty acids, for example, zinc stearate, magnesium stearate, calcium stearate, dyes such as ultramarine blue, cobalt violet, antioxidants, fluorescent whiteners, ultraviolet absorbers, fire retardants, matte particles or roughening agents, such as silica, titanium dioxide, talc, barium sulfate, clay, and alumina, cross linking agents, solvents and cosolvents, and voiding agents. These optional components and appropriate amounts are well known in the art and can be chosen according to need.

A preferred application of the invention is in imaging elements, including those utilizing photographic, electrophotographic, electrostatographic, photothermographic, migration, electrothermographic, dielectric recording, thermal dye transfer, ink jet and other types of imaging. A more preferred application of the invention is in photographic imaging elements, particularly photographic paper and other display products. Display products may include both photographic display products as well as flat panel-type display products, for example, liquid crystal display products.

The antistatic layer may be used in flat panel-type display products or other products having an electrically modulated imaging material on a substrate. The substrate bears an electrically modulated imaging layer on at least one surface. A suitable material may include electrically modulated material disposed on a suitable substrate structure, such as on or between one or more electrodes. The term "electrically modulated material" as used herein is intended to include any suitable non-volatile material. Suitable materials for the electrically modulated material are described in U.S. patent application Ser. No. 09/393,553 and U.S. Provisional Patent Application Ser. No. 60/099,888, both herein incorporated by reference.

The electrically modulated material may also be printable, conductive ink having an arrangement of particles or microscopic containers or microcapsules. Each microcapsule contains an electrophoretic composition of a fluid, such as a dielectric or emulsion fluid, and a suspension of colored or charged particles or colloidal material. The diameter of the microcapsules typically ranges from about 30 to about 300 microns. According to one practice, the particles visually contrast with the dielectric fluid. According to another example, the electrically modulated material may include rotatable balls that can rotate to expose a different colored surface area, and which can migrate between a forward viewing position and/or a rear non-viewing position, such as gyricon. Specifically, gyricon is a material comprised of twisting rotating elements contained in liquid-filled spherical cavities and embedded in an elastomer medium. The rotating elements may be made to exhibit changes in optical properties by the imposition of an external electric field. Upon application of an electric field of a given polarity, one segment of a rotating element rotates toward and is visible by an observer of the display. Application of an electric field of opposite polarity causes the element to rotate and expose a second, different segment to the observer. A gyricon display maintains a given configuration until an electric field is actively applied to the display assembly. Gyricon particles typically have a diameter of about 100 microns. Gyricon materials are disclosed in U.S. Pat. Nos. 6,147,791, 4,126, 854 and 6,055,091, herein incorporated by reference.

According to one practice, the microcapsules may be filled with electrically charged white particles in a black or colored dye. Examples of electrically modulated material and methods of fabricating assemblies capable of controlling or effecting the orientation of the ink suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, herein incorporated by reference.

The electrically modulated material may also include material disclosed in U.S. Pat. No. 6,025,896, incorporated herein by reference. This material comprises charged particles in a liquid dispersion medium encapsulated in a large number of microcapsules. The charged particles can have different types of color and charge polarity. For example white positively charged particles can be employed along with black negatively charged particles. The described microcapsules are disposed between a pair of electrodes, such that a desired image is formed and displayed by the material by varying the dispersion state of the charged particles. The dispersion state of the charged particles is varied through a controlled electric field applied to the electrically modulated material. According to a preferred embodiment, the particle diameters of the microcapsules are between 5 microns and 200 microns, and the particle diameters of the charged particles are between one-thousandth and one-fifth the size of the particle diameters of the microcapsules.

Further, the electrically modulated material may include a thermo-chromic material. A thermo-chromic material is capable of changing its state alternately between transparent and opaque upon the application of heat. In this manner, a thermo-chromic imaging material develops images through the application of heat at specific pixel locations in order to form an image. The thermo-chromic imaging material retains a particular image until heat is again applied to the material. Since the rewritable material is transparent, UV fluorescent printings, designs and patterns underneath can be seen through.

The electrically modulated material may also include surface stabilized ferroelectric liquid crystals (SSFLC). Surface stabilized ferroelectric liquid crystals confine ferroelectric liquid crystal material between closely spaced glass plates to suppress the natural helix configuration of the crystals. The cells switch rapidly between two optically distinct, stable states simply by alternating the sign of an applied electric field.

Magnetic particles suspended in an emulsion comprise an additional imaging material suitable for use with the present invention. Application of a magnetic force alters pixels formed with the magnetic particles in order to create, update or change human and/or machine readable indicia. Those skilled in the art will recognize that a variety of bi-stable non-volatile imaging materials are available and may be implemented in the present invention.

The electrically modulated material may also be configured as a single color, such as black, white or clear, and may be fluorescent, iridescent, bioluminescent, incandescent, ultraviolet, infrared, or may include a wavelength specific radiation absorbing or emitting material. There may be multiple layers of electrically modulated material. Different layers or regions of the electrically modulated material display material may have different properties or colors. Moreover, the characteristics of the various layers may be different from each other. For example, one layer can be used to view or display information in the visible light range, while a second layer responds to or emits ultraviolet light. The non-visible layers may alternatively be constructed of non-electrically modulated material based materials that have radiation absorbing or emitting characteristics. The electrically modulated material employed in connection with the present invention preferably has the characteristic that it does not require power to maintain display of indicia.

As used herein, the phrase a "liquid crystal display" (LCD) is a type of flat panel display used in various electronic devices. At a minimum, an LCD comprises a substrate, at least one conductive layer, a liquid crystal layer, and a means for generating an electrical field across the liquid crystal layer, sufficient to change the state of the liquid crystal material. LCDs may also comprise two sheets of polarizing material with a liquid crystal solution between the polarizing sheets. The sheets of polarizing material may comprise a substrate of glass or transparent plastic. The LCD may also include functional layers. In one embodiment of an LCD, a transparent, multilayer flexible support, also referred to herein as a substrate, is coated with a first conductive layer, which may be patterned, onto which is coated the light-modulating liquid crystal layer. A second conductive layer is applied and overcoated with a dielectric layer to which dielectric conductive row contacts are attached, including vias that permit interconnection between conductive layers and the dielectric conductive row contacts. An optional nanopigmented functional layer may be applied between the liquid crystal layer and the second conductive layer.

The liquid crystal (LC) is used as an optical switch. The substrates are usually manufactured with transparent, conductive electrodes, in which electrical "driving" signals are coupled. The driving signals induce an electric field which can cause a phase change or state change in the liquid crystal material, the liquid crystal exhibiting different light-reflecting characteristics according to its phase and/or state.

There are alternative display technologies to LCDs that can be used, for example, in flat panel displays. A notable example is organic or polymer light-emitting devices (OLEDs) or (PLEDs), which are comprised of several layers in which one of the layers is comprised of an organic material that can be made to electroluminesce by applying a voltage across the device. An OLED device is typically a laminate formed in a substrate such as glass or a plastic polymer. A light-emitting layer of a luminescent organic solid, as well as adjacent semiconductor layers, is sandwiched between an anode and a cathode. The semiconductor layers can be whole-injecting and electron-injecting layers. PLEDs can be considered a subspecies of OLEDs in which the luminescent organic material is a polymer. The light-emitting layers may be selected from any of a multitude of light-emitting organic solids, for example, polymers that are suitably fluorescent or chemiluminescent organic compounds. Such compounds and polymers include metal ion salts of 8-hydroxyquinolate, trivalent metal quinolate complexes, trivalent metal bridged quinolate complexes, Schiff-based divalent metal complexes, tin (IV) metal complexes, metal acetylacetonate complexes, metal bidenate ligand complexes incorporating organic ligands, such as 2-picolylketones, 2-quinaldylketones, or 2-(o-phenoxy) pyridine ketones, bisphosphonates, divalent metal maleonitriledithiolate complexes, molecular charge transfer complexes, rare earth mixed chelates, (5-hydroxy) quinoxaline metal complexes, aluminum tris-quinolates, and polymers such as poly(p-phenylenevinylene), poly(dialkoxyphenylenevinylene), poly(thiophene), poly(fluorene), poly(phenylene), poly(phenylacetylene), poly(aniline), poly(3-alkylthiophene), poly(3-octylthiophene), and poly(N-vinylcarbazole). When a potential difference is applied across the cathode and anode, electrons from the electron-injecting layer and holes from the hole-injecting layer are injected into the light-emitting layer; they recombine, emitting light. OLEDs and PLEDs are described in the following United States patents, all of which are incorporated herein by this reference: U.S. Pat. No. 5,707,745 to Forrest et al., U.S. Pat. No. 5,721,160 to Forrest et al., U.S. Pat. No. 5,757,026 to Forrest et al., U.S. Pat. No. 5,834,893 to Bulovic et al., U.S. Pat. No. 5,861,219 to Thompson et al., U.S. Pat. No. 5,904,916 to Tang et al., U.S. Pat. No. 5,986,401 to Thompson et al., U.S. Pat. No. 5,998,803 to Forrest et al., U.S. Pat. No. 6,013,538 to Burrows et al., U.S. Pat. No. 6,046,543 to Bulovic et al., U.S. Pat. No. 6,048,573 to Tang et al., U.S. Pat. No. 6,048,630 to Burrows et al., U.S. Pat. No. 6,066,357 to Tang et al., U.S. Pat. No. 6,125,226 to Forrest et al., U.S. Pat. No. 6,137,223 to Hung et al., U.S. Pat. No. 6,242,115 to Thompson et al., and U.S. Pat. No. 6,274,980 to Burrows et al.

In a typical matrix-address light-emitting display device, numerous light-emitting devices are formed on a single substrate and arranged in groups in a regular grid pattern. Activation may be by rows and columns, or in an active matrix with individual cathode and anode paths. OLEDs are often manufactured by first depositing a transparent electrode on the substrate, and patterning the same into electrode portions. The organic layer(s) is then deposited over the transparent electrode. A metallic electrode can be formed over the electrode layers. For example, in U.S. Pat. No. 5,703,436 to Forrest et al., incorporated herein by reference, transparent indium tin oxide (ITO) is used as the hole-injecting electrode, and a Mg—Ag—ITO electrode layer is used for electron injection.

The preferred electrically modulated imaging layer comprises a liquid crystalline material. Liquid crystals can be nematic (N), chiral nematic (N*), or smectic, depending upon the arrangement of the molecules in the mesophase. Chiral nematic liquid crystal (N*LC) displays are typically reflective, that is, no backlight is needed, and can function without the use of polarizing films or a color filter.

Chiral nematic liquid crystal refers to the type of liquid crystal having finer pitch than that of twisted nematic and super-twisted nematic used in commonly encountered LC devices. Chiral nematic liquid crystals are so named because such liquid crystal formulations are commonly obtained by adding chiral agents to host nematic liquid crystals. Chiral nematic liquid crystals may be used to produce bi-stable or multi-stable displays. These devices have significantly reduced power consumption due to their non-volatile "memory" characteristic. Since such displays do not require a continuous driving circuit to maintain an image, they consume significantly reduced power. Chiral nematic displays are bistable in the absence of a field; the two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state the helical axes of the liquid crystal molecules are generally randomly oriented. Adjusting the concentration of chiral dopants in the chiral nematic material modulates the pitch length of the mesophase and, thus, the wavelength of radiation reflected. Chiral nematic materials that reflect infrared radiation and ultraviolet have been used for purposes of scientific study. Commercial displays are most often fabricated from chiral nematic materials that reflect visible light. Some known LCD devices include chemically etched, transparent, conductive layers overlying a glass substrate as described in U.S. Pat. No. 5,667,853, incorporated herein by reference.

In one embodiment, the liquid crystal may be applied as a substantial monolayer. The term "substantial monolayer" is defined by the Applicants to mean that, in a direction perpendicular to the plane of the display, there is no more than a single layer of domains sandwiched between the electrodes at most points of the display (or the imaging layer), preferably at 75 percent or more of the points (or area) of the display, most preferably at 90 percent or more of the points (or area) of the display. In other words, at most, only a minor portion (preferably less than 10 percent) of the points (or area) of the display has more than a single domain (two or more domains) between the electrodes in a direction perpendicular to the plane of the display, compared to the amount of points (or area) of the display at which there is only a single domain between the electrodes.

The amount of material needed for a monolayer can be accurately determined by calculation based on individual domain size, assuming a fully closed packed arrangement of domains. (In practice, there may be imperfections in which gaps occur and some unevenness due to overlapping droplets or domains.) On this basis, the calculated amount is preferably less than about 150 percent of the amount needed for monolayer domain coverage, preferably not more than about 125 percent of the amount needed for a monolayer domain coverage, more preferably not more than 110 percent of the amount needed for a monolayer of domains. Furthermore, improved viewing angle and broadband features may be obtained by appropriate choice of differently doped domains based on the geometry of the coated droplet and the Bragg reflection condition.

In a preferred embodiment of the invention, the display device or display sheet has simply a single imaging layer of liquid crystal material along a line perpendicular to the face of the display, preferably a single layer coated on a flexible substrate. Such a structure, as compared to vertically stacked imaging layers each between opposing substrates, is especially advantageous for monochrome shelf labels and the like. Structures having stacked imaging layers, however, are optional for providing additional advantages in some cases, such as multi-color or full-color, for example, RGB displays.

Preferably, the domains are flattened spheres and have on average a thickness substantially less than their length, preferably at least 50% less. More preferably, the domains on average have a thickness (depth) to length ratio of 1:2 to 1:6. Proper formulation and sufficiently rapid drying of the coating can achieve the flattening of the domains. The domains preferably have an average diameter of 2 to 30 microns. The imaging layer preferably has a thickness of 10 to 150 microns when first coated and 2 to 20 microns when dried.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

Modern chiral nematic liquid crystal materials usually include at least one nematic host combined with a chiral dopant. In general, the nematic liquid crystal phase is composed of one or more mesogenic components combined to provide useful composite properties. Many such materials are available commercially. The nematic component of the chiral nematic liquid crystal mixture may be comprised of any suitable nematic liquid crystal mixture or composition having appropriate liquid crystal characteristics. The nematic liquid crystal phases typically consist of 2 to 20, preferably 2 to 15 components. The above list of materials is not intended to be exhaustive or limiting. The lists disclose a variety of representative materials suitable for use or mixtures, which comprise the active element in electro-optic liquid crystal compositions.

Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bi-stability and gray scale memory. The chiral nematic liquid crystal is typically a mixture of nematic liquid crystal and chiral material in an amount sufficient to produce the desired pitch length. Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100. TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

The chiral dopant added to the nematic mixture to induce the helical twisting of the mesophase, thereby allowing reflection of visible light, can be of any useful structural class. The choice of dopant depends upon several characteristics including among others its chemical compatibility with the nematic host, helical twisting power, temperature sensitivity, and light fastness. Many chiral dopant classes are known in the art: for example, G. Gottarelli and G. Spada, Mol. Cryst. Liq. Crys., 123, 377 (1985); G. Spada and G.

Proni, Enantiomer, 3, 301 (1998), U.S. Pat. Nos. 6,217,792; 6,099,751; and U.S. patent application Ser. No. 10/651,692, hereby incorporated by reference.

Chiral nematic liquid crystal materials and cells, as well as polymer stabilized chiral nematic liquid crystals and cells, are well known in the art and described in, for example, co-pending application Ser. No. 07/969,093 filed Oct. 30, 1992; Ser. No. 08/057,662 filed May 4, 1993; Yang et al., Appl. Phys. Lett. 60(25) pp 3102–04 (1992); Yang et al., J. Appl. Phys. 76(2) pp 1331 (1994); published International Patent Application No. PCT/US92/09367; and published International Patent Application No. PCT/US92/03504, all of which are incorporated herein by reference.

The liquid crystalline droplets or domains may be formed by any method, known to those of skill in the art, which will allow control of the domain size. Liquid crystal domains are preferably made using a limited coalescence methodology, as disclosed in U.S. Pat. Nos. 6,556,262 and 6,423,368, incorporated herein by reference. Limited coalescence is defined as dispersing a light-modulating material below a given size, and using coalescent limiting material to limit the size of the resulting domains. Such materials are characterized as having a ratio of maximum to minimum domain size of less than 2:1. By use of the term "uniform domains", it is meant that domains are formed having a domain size variation of less than 2:1. Limited domain materials have improved optical properties.

An immiscible, field responsive light-modulating material along with a quantity of colloidal particles is dispersed in an aqueous system and blended to form a dispersion of field-responsive, light-modulating material below a coalescence size. When the dispersion, also referred to herein as an emulsion, is dried, a coated material is produced which has a set of uniform domains having a plurality of electrically responsive optical states. The colloidal solid particle, functioning as an emulsifier, limits domain growth from a highly dispersed state. Uniformly sized liquid crystal domains are created and machine coated to manufacture light-modulating, electrically responsive sheets with improved optical efficiency.

Specifically, a liquid crystal material may be dispersed an aqueous bath containing a water-soluble binder material such as de-ionized gelatin, polyvinyl alcohol (PVA) or polyethylene oxide (PEO). Such compounds are machine coatable on equipment associated with photographic films. Preferably, the binder has a low ionic content, as the presence of ions in such a binder hinders the development of an electrical field across the dispersed liquid crystal material. Additionally, ions in the binder can migrate in the presence of an electrical field, chemically damaging the light-modulating layer. The liquid crystal/gelatin emulsion is coated to a thickness of between 5 and 30 microns to optimize optical properties of light modulating layer. The coating thickness, size of the liquid crystal domains, and concentration of the domains of liquid crystal materials are designed for optimum optical properties.

In an exemplary embodiment, a liquid crystalline material is homogenized in the presence of finely divided silica, a coalescence limiting material, (LUDOX® from duPont Corporation). A promoter material, such as a copolymer of adipic acid and 2-(methylamino) ethanol, is added to the aqueous bath to drive the colloidal particles to the liquid-liquid interface. The liquid crystal material is dispersed using ultrasound to create liquid crystal domains below 1 micron in size. When the ultrasound energy was removed, the liquid crystal material coalesced into domains of uniform size. The ratio of smallest to largest domain size varied by approximately 1:2. By varying the amount of silica and copolymer relative to the liquid crystalline material, uniform domain size emulsions of average diameter (by microscopy) approximately 1, 3, and, 8 micron were produced. These emulsions were diluted into gelatin solution for subsequent coating.

Domains of a limited coalescent material maintain their uniform size after the addition of the surfactant and after being machine coated. There were few, if any, parasitic domains having undesirable electro-optical properties within the dried coatings produced by the limited coalescence method. Coatings made using limited coalescence having a domain size of about 2 microns may have the greatest translucence. For constant material concentrations and coating thickness, limited coalescent materials having a domain size of about 2 microns in size are significantly more translucent than any sized domains formed using conventional dispersion.

Sheets made by the limited coalescence process have curves similar to those of conventionally dispersed materials. However, with 8 to 10 micron domains, the material may demonstrate reduced scattering due to the elimination of parasitic domains. Conventionally dispersed cholesteric materials contain parasitic domains, which reflect light in wavelengths outside the wavelengths reflected by the cholesteric material. Limited coalescent dispersions have reduced reflection in other wavelengths due to the elimination of parasitic domains. The increased purity of color is important in the development of full color displays requiring well-separated color channels to create a full-color image. Limited coalescent cholesteric materials provide purer light reflectance than cholesteric liquid crystal material dispersed by conventional methods. Such materials may be produced using conventional photographic coating machinery.

As for the suspension stabilizing agents that surround and serve to prevent the coalescence of the droplets, any suitable colloidal stabilizing agent known in the art of forming polymeric particles by the addition reaction of ethylenically unsaturated monomers by the limited coalescence technique can be employed, such as, for example, inorganic materials such as, metal salt or hydroxides or oxides or clays, organic materials such as starches, sulfonated crosslinked organic homopolymers and resinous polymers as described, for example, in U.S. Pat. No. 2,932,629; silica as described in U.S. Pat. No. 4,833,060; copolymers such as copoly(styrene-2-hydroxyethyl methacrylate-methacrylic acid-ethylene glycol dimethacrylate) as described in U.S. Pat. No. 4,965,131, all of which are incorporated herein by reference. Silica is the preferred suspension stabilizing agent.

Suitable promoters to drive the suspension stabilizing agent to the interface of the droplets and the aqueous phase include sulfonated polystyrenes, alginates, carboxymethyl cellulose, tetramethyl ammonium hydroxide or chloride, triethylphenyl ammonium hydroxide, triethylphenyl ammonium hydroxide, triethylphenyl ammonium chloride, diethylaminoethylmethacrylate, water-soluble complex resinous amine condensation products, such as the water soluble condensation product of diethanol amine and adipic acid, such as poly(adipic acid-co-methylaminoethanol), water soluble condensation products of ethylene oxide, urea, and formaldehyde and polyethyleneimine; gelatin, glue, casein, albumin, gluten, and methoxycellulose. The preferred promoter is triethylphenyl ammonium chloride.

In order to provide suitable formulations for applying a layer containing the liquid crystal domains, the dispersions may be combined with a polymer to form a polymer dispersed liquid crystalline material (PDLC). Surfactants may be included with the liquid crystal dispersion prior to the addition of polymer in order to prevent the removal of the particulate suspension stabilizing agent from the droplets. This aids in preventing further coalescence of the droplets.

In one embodiment, a chiral-nematic liquid crystal composition may be dispersed in a continuous matrix. Such materials are referred to as "polymer-dispersed liquid crystal" materials or "PDLC" materials. Such materials can be made by a variety of methods. For example, Doane et al. (Applied Physics Letters, 48, 269 (1986)) disclose a PDLC comprising approximately 0.4 mm droplets of nematic liquid crystal 5CB in a polymer binder. A phase separation method is used for preparing the PDLC. A solution containing monomer and liquid crystal is filled in a display cell and the material is then polymerized. Upon polymerization the liquid crystal becomes immiscible and nucleates to form droplets. West et al. (Applied Physics Letters 63, 1471 (1993)) disclose a PDLC comprising a chiral nematic mixture in a polymer binder. Once again a phase separation method is used for preparing the PDLC. The liquid crystal material and polymer (a hydroxy functionalized polymethylmethacrylate) along with a cross-linker for the polymer are dissolved in a common organic solvent toluene and coated on an indium tin oxide (ITO) substrate. A dispersion of the liquid-crystal material in the polymer binder is formed upon evaporation of toluene at high temperature. The phase separation methods of Doane et al. and West et al. require the use of organic solvents that may be objectionable in certain manufacturing environments.

Preferably, the dispersing polymer is a hydrophilic binder. Suitable hydrophilic binders include both naturally occurring substances such as proteins, protein derivatives, cellulose derivatives (for example cellulose esters), gelatins and gelatin derivatives, polysaccaharides, casein, and the like, and synthetic water permeable colloids such as poly(vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin is preferred.

Gelatin, containing hardener, may optionally be used in the present invention. In the context of this invention, hardeners are defined as any additive, which causes chemical crosslinking in gelatin or gelatin derivatives. Many conventional hardeners are known to crosslink gelatin. Gelatin crosslinking agents (that is, the hardener) are included in an amount of at least about 0.01 wt. % and preferably from about 0.1 to about 10 wt. % based on the weight of the solid dried gelatin material used (by dried gelatin is meant substantially dry gelatin at ambient conditions as for example obtained from Eastman Gel Co., as compared to swollen gelatin), and more preferably in the amount of from about 1 to about 5 percent by weight. More than one gelatin crosslinking agent can be used if desired. Suitable hardeners may include inorganic, organic hardeners, such as aldehyde hardeners and olefinic hardeners. Inorganic hardeners include compounds such as aluminum salts, especially the sulfate, potassium and ammonium alums, ammonium zirconium carbonate, chromium salts such as chromium sulfate and chromium alum, and salts of titanium dioxide, and zirconium dioxide. Representative organic hardeners or gelatin crosslinking agents may include aldehyde and related compounds, pyridiniums, olefins, carbodiimides, and epoxides. Thus, suitable aldehyde hardeners include formaldehyde and compounds that contain two or more aldehyde functional groups such as glyoxal, gluteraldehyde and the like. Other preferred hardeners include compounds that contain blocked aldehyde functional groups such as aldehydes of the type tetrahydro-4-hydroxy-5-methyl-2(1H)-pyrimidinone polymers (Sequa SUNREZâ 700), polymers of the type having a glyoxal polyol reaction product consisting of 1 anhydroglucose unit: 2 glyoxal units (SE-QUAREZâ 755 obtained from Sequa Chemicals, Inc.), DME-Melamine non-formaldehyde resins such as Sequa CPD3046-76 obtained from Sequa Chemicals Inc., and 2,3-dihydroxy-1,4-dioxane (DHD). Thus, hardeners that contain active olefinic functional groups include, for example, bis-(vinylsulfonyl)-methane (BVSM), bis-(vinylsulfonyl-methyl) ether (BVSME), 1,3,5-triacryloylhexahydro-s-triazine, and the like. In the context of the present invention, active olefinic compounds are defined as compounds having two or more olefinic bonds, especially unsubstituted vinyl groups, activated by adjacent electron withdrawing groups (The Theory of the Photographic Process, 4th Edition, T. H. James, 1977, Macmillan Publishing Co., page 82). Other examples of hardening agents can be found in standard references such as The Theory of the Photographic Process, T. H. James, Macmillan Publishing Co., Inc. (New York 1977) or in Research Disclosure, September 1996, Vol. 389, Part IIB (Hardeners) or in Research Disclosure, September 1994, Vol. 365, Item 36544, Part IIB (Hardeners). Research Disclosure is published by Kenneth Mason Publications, Ltd., Dudley House, 12 North St., Emsworth, Hampshire P010 7DQ, England. Olefinic hardeners are most preferred, as disclosed in U.S. Pat. Nos. 3,689,274, 2,994,611, 3,642,486, 3,490,911, 3,635,718, 3,640,720, 2,992,109, 3,232,763, and 3,360,372.

Among hardeners of the active olefin type, a preferred class of hardeners particularly are compounds comprising two or more vinyl sulfonyl groups. These compounds are hereinafter referred to as "vinyl sulfones." Compounds of this type are described in numerous patents including, for example, U.S. Pat. Nos. 3,490,911, 3,642,486, 3,841,872 and 4,171,976. Vinyl sulfone hardeners are believed to be effective as hardeners as a result of their ability to crosslink polymers making up the colloid.

In order to prevent the dispersing polymer from removing the suspension stabilizing agent from the surface of the droplets, suitable anionic surfactants may be included in the mixing step to prepare the coating composition such as polyisopropyl naphthalene-sodium sulfonate, sodium dodecyl sulfate, sodium dodecyl benzene sulfonate, as well as those anionic surfactants set forth in U.S. Pat. No. 5,326,687 and in Section XI of Research Disclosure 308119, December 1989, entitled "Photographic Silver Halide Emulsions, Preparations, Addenda, Processing, and Systems", both of which are incorporated herein by reference. Aromatic sulfonates are more preferred and polyisopropyl naphthalene sulfonate is most preferred.

The antistatic layer is applied to a substrate. The substrate may be either opaque or transparent. Preferably, the substrate for the display is a flexible plastic substrate, which can be any flexible self-supporting plastic film that supports the thin conductive metallic film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self-supporting, yet should not be so thick as to be rigid. Typically, the flexible plastic substrate is the thickest layer of the composite film in thickness. Consequently, the substrate determines to a large extent the mechanical and thermal stability of the fully structured composite film.

Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post-manufacturing conditions such as in a process line of a displays manufacturer. Certain of the plastic substrates discussed below can withstand higher processing temperatures of up to at least about 200° C., some up to 3000–350° C., without damage.

Typically, the flexible plastic substrate, which is most preferably transparent, is polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, acetate, for example, cellulose acetate, aliphatic polyurethanes, polyacrylonitrile, polytetrafluoroethylenes, polyvinylidene fluorides, poly(methyl (x-methacrylates), an aliphatic or cyclic polyolefin, polyarylate (PAR), polyetherimide (PEI), polyimide (PI), Teflon poly(perfluoro-alboxy) fluoropolymer (PFA), poly(ether ketone) (PEEK), poly(ether ketone) (PEK), poly(ethylene tetrafluoroethylene)fluoropolymer (PETFE), and poly(methyl methacrylate) and various acrylate/methacrylate copolymers (PMMA). Aliphatic polyolefins may include high density polyethylene (HDPE), low density polyethylene (LDPE), and polypropylene, including oriented polypropylene (OPP). Polyolefins and cyclic polyolefins may be included. A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan; Zeanor T made by Zeon Chemicals L.P., Tokyo Japan; and Topas® made by Celanese A. G., Kronberg Germany. Arton is a poly(bis(cyclopentadiene)) condensate that is a film of a polymer. A preferred polyester is an aromatic polyester such as Arylite. Although various examples of plastic substrates are set forth above, it should be appreciated that the substrate can also be formed from other materials such as glass and quartz.

Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by known techniques, for example, those described in U.S. Pat. Nos. 2,465,319 and 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607, 4,459,402 and 4,468,510.

Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins may also be utilized.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec." Lintec contains UV-cured polyester acrylate and colloidal silica. When deposited on Arton, it has a surface composition of 35 atom % C, 45 atom % 0, and 20 atom % Si, excluding hydrogen. Another particularly preferred hard coating is the acrylic coating sold under the trademark "Terrapin" by Tekra Corporation, New Berlin, Wis.

In another embodiment, the substrates preferably comprise opaque supports. Opaque substrates include plain paper, coated paper, resin-coated paper such as polyolefin-coated paper, synthetic paper, photographic paper support, melt-extrusion-coated paper, polyolefin-laminated paper, such as biaxially oriented support laminates, web materials, and sheet materials. In a preferred embodiment, the substrate comprises a support for an imaging element, which has an opacity of greater than 60. The substrate may also consist of microporous materials such as polyethylene polymer-containing material sold by PPG Industries, Inc., Pittsburgh, Pa. under the trade name of Teslin®, Tyvek® synthetic paper (DuPont Corp.), impregnated paper such as Duraform®, and OPPalyte® films (Mobil Chemical Co.) and other composite films listed in U.S. Pat. No. 5,244,861. Commercially available oriented and unoriented polymer films, such as opaque biaxially oriented polypropylene or polyester, may also be utilized. Such supports may contain pigments, air voids or foam voids to enhance their opacity. The substrates may be white, black or other color that enhances the display. When opaque substrates are used in displays, typically, the opaque substrate acts as a back reflector that provides added contrast to the image formed in the liquid crystal display layer. In a stacked display with more than one color, those substrates between the viewer and the back reflector are transparent.

The opaque substrate used in the invention may have a thickness of from 50 to 500 μm, preferably from 75 to 350 μm. Antioxidants, brightening agents, antistatic or conductive agents, plasticizers and other known additives may be incorporated into the substrate, if desired.

In addition, it may be desirable to use various additives such as antioxidants, stiffness enhancing agents, slip agents, or lubricants, and light stabilizers in the synthetic elements, especially synthetic plastic elements, as well as biocides in the paper elements. These additives are added to improve, among other things, the dispersibility of fillers and/or colorants, as well as the thermal and color stability during processing and the manufacturability and the longevity of the finished article. For example, polyolefin coatings may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3',5'-di-tert-butyl-4'-hydroxyphenyl propionate), combinations of the above, lubricants, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate; light stabilizers such as hindered amine light stabilizers (HALS), of which a preferred example is poly{[6-[(1,1,3,3-tetramethylbutylamino}-1,3,5-triazine-4-piperidinyl)-imino]-1,6-hexanediyl[{2,2,6,6-tetramethyl-4-piperidinyl)imino]}(Chimassorb® 944 LD/FL), 7-Oxa-3,20-diazadispiro[5.1.11.2]heneicosan-21-one, 2,2,4,4-tetramethyl-20-(oxiranylmethyl)-, homopolymer (Hostavin® N30).

The LCD contains at least one conductive layer. In one embodiment, the electrically conductive layer has a surface conductivity of less than $10^4$ ohms/sq, sufficient to switch the state of the electrically modulated material. Typically, the conductive layer is comprised of a primary metal oxide. This conductive layer may comprise other metal oxides such as indium oxide, titanium dioxide, cadmium oxide, gallium indium oxide, niobium pentoxide and tin dioxide. See, Int. Publ. No. WO 99/36261 by Polaroid Corporation. In addition to the primary oxide such as ITO, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.). Other transparent conductive oxides include, but are not limited to ZnO2, Zn2SnO4, Cd2SnO4, Zn2In205, MgIn2O4, Ga2O3—In2O3, or TaO3. The conductive layer may be formed, for example, by a low temperature sputtering technique or by a direct current sputtering technique, such as DC-sputtering or RF-DC sputtering, depending upon the material or materials of the underlying layer. The conductive layer may be a transparent, electrically conductive layer of tin-oxide or indium-tin-oxide (ITO), or polythiophene, with ITO being the preferred material. Typically, the conductive layer is sputtered onto the substrate to a surface electrical-resistivity of less than 300 ohms per square. Alternatively, conductive layer may be an opaque electrical conductor formed of metal such as copper, aluminum or nickel. If the conductive layer is an opaque metal, the metal can be a metal oxide to create a light absorbing conductive layer.

Indium tin oxide (ITO) is the preferred conductive material, as it is a cost effective conductor with good environmental stability, up to 90% transmission, and down to 20 ohms per square resistivity. An exemplary preferred ITO layer has a % T greater than or equal to 80% in the visible region of light, that is, from greater than 400 nm to 700 nm, so that the film will be useful for display applications. In a preferred embodiment, the conductive layer comprises a layer of low temperature ITO which is polycrystalline. The ITO layer is preferably 10–120 nm in thickness, or 50–100 nm thick to achieve a resistivity of 20–60 ohms/square on plastic. An exemplary preferred ITO layer is 60–80 nm thick.

The conductive layer is preferably patterned. The conductive layer is preferably patterned into a plurality of electrodes. The patterned electrodes may be used to form a LCD device. In another embodiment, two conductive substrates are positioned facing each other and cholesteric liquid crystals are positioned there between to form a device. The patterned ITO conductive layer may have a variety of dimensions. Exemplary dimensions may include line widths of 10 microns, distances between lines, that is, electrode widths, of 200 microns, depth of cut, that is, thickness of ITO conductor, of 100 nanometers. ITO thicknesses on the order of 60, 70, and greater than 100 nanometers are also possible.

The display may also contain a second conductive layer applied to the surface of the light-modulating layer. The second conductive layer desirably has sufficient conductivity to carry a field across the light-modulating layer. The second conductive layer may be formed in a vacuum environment using materials such as aluminum, tin, silver, platinum, carbon, tungsten, molybdenum, or indium. Oxides of these metals can be used to darken patternable conductive layers. The metal material can be excited by energy from resistance heating, cathodic arc, electron beam, sputtering or magnetron excitation. The second conductive layer may comprise coatings of tin-oxide or indium-tin oxide, resulting in the layer being transparent. Alternatively, second conductive layer may be printed conductive ink.

For higher conductivities, the second conductive layer may comprise a silver-based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In a preferred embodiment, the conductive layer comprises at least one of gold, silver and a gold/silver alloy, for example, a layer of silver coated on one or both sides with a thinner layer of gold. See, Int. Publ. No. WO 99/36261 by Polaroid Corporation. In another embodiment, the conductive layer may comprise a layer of silver alloy, for example, a layer of silver coated on one or both sides with a layer of indium cerium oxide (InCeO). See U.S. Pat. No. 5,667,853, incorporated herein in by reference.

The second conductive layer may be patterned irradiating the multilayered conductor/substrate structure with ultraviolet radiation so that portions of the conductive layer are ablated therefrom. It is also known to employ an infrared (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17–22, 1998, no. VOL. 29, May 17, 1998, pages 1099–1101, both incorporated herein by reference.

In addition to a second conductive layer, other means may be used to produce a field capable of switching the state of the liquid crystal layer as described in, for example, U.S. Pat. Appl. Nos. 20010008582 A1, 20030227441 A1, 20010006389 A1, and U.S. Pat. Nos. 6,424,387, 6,269,225, and 6,104,448, all incorporated herein by reference.

The LCD may also comprise at least one "functional layer" between the conductive layer and the substrate. The functional layer may comprise a protective layer or a barrier layer. The protective layer useful in the practice of the invention can be applied in any of a number of well known techniques, such as dip coating, rod coating, blade coating, air knife coating, gravure coating and reverse roll coating, extrusion coating, slide coating, curtain coating, and the like. The lubricant particles and the binder are preferably mixed together in a liquid medium to form a coating composition. The liquid medium may be a medium such as water or other aqueous solutions in which the hydrophilic colloid are dispersed with or without the presence of surfactants. A preferred barrier layer may acts as a gas barrier or a moisture barrier and may comprise SiOx, AlOx or ITO. The protective layer, for example, an acrylic hard coat, functions to prevent laser light from penetrating to functional layers between the protective layer and the substrate, thereby protecting both the barrier layer and the substrate. The functional layer may also serve as an adhesion promoter of the conductive layer to the substrate.

Another type of functional layer may be a color contrast layer. Color contrast layers may be radiation reflective layers or radiation absorbing layers. In some cases, the rearmost substrate of each display may preferably be painted black. The color contrast layer may also be other colors. In another embodiment, the dark layer comprises milled nonconductive pigments. The materials are milled below 1 micron to form "nano-pigments". In a preferred embodiment, the dark layer absorbs all wavelengths of light across the visible light spectrum, that is, from 400 nanometers to 700 nanometers wavelength. The dark layer may also contain a set or multiple pigment dispersions. Suitable pigments used in the color contrast layer may be any colored materials, which are practically insoluble in the medium in which they are incorporated. Suitable pigments include those described in Industrial Organic Pigments: Production, Properties, Applications by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolo-pyrrole, and thioindigo, and anthriquinone pigments such as anthrapyrimidine.

The functional layer may also comprise a dielectric material. A dielectric layer, for purposes of the present invention, is a layer that is not conductive, that is, has a much higher resistivity than the conductive layer, or blocks the flow of electricity. This dielectric material may include a UV curable, thermoplastic, screen printable material, such as Electrodag 25208 dielectric coating from Acheson Corporation. The dielectric material forms a dielectric layer. This layer may include openings to define image areas, which are coincident with the openings. Since the image is viewed through a transparent substrate, the indicia are mirror imaged. The dielectric material may form an adhesive layer to subsequently bond a second electrode to the light modulating layer.

The display substrate may also be provided with additional functional layers that may serve to change the properties of the support. These might include layers, to improve opacity, to control color, to make them heat sealable, or to improve the adhesion to the support or to the photosensitive layers. Examples of this would be coating polyvinylidene chloride for heat seal properties. Further examples include flame, plasma, or corona discharge treatment to improve printability or adhesion.

The antistatic layer of the present invention may be applied to the substrate or support in a manner capable of producing a layer or layers that allow an electrical charge to travel along the substrate until the charge can be grounded or the level of charge be dissipated so as to prevent the electrical field from building to the point that it can switch states in a liquid crystal. The layers preferably provide a continuous conductive pathway and/or a network of conductive pathways on, around, or in the substrate or support.

The antistatic layer may be a coated or printed layer. The layer may be applied onto the substrate or support by conventional coating and printing means commonly used in this art. Coating methods may include, but are not limited to, extrusion coating, blade coating, wound wire rod coating, slot coating, hopper and slide hopper coating, gravure coating, curtain coating, spray coating, or inkjet coating. Printing methods may include gravure printing, offset printing, thermography, screen printing, electrophotography and other techniques. Some of these methods allow for simultaneous coatings of layers, which is preferred from a manufacturing economic perspective. Simultaneous coating may include simultaneous or consecutive extrusion coating or combinations thereof.

The surface on which the antistatic layer is deposited may be treated for improved adhesion by any of the means known in the art, such as acid etching, flame treatment, corona discharge treatment, glow discharge treatment or may be coated with a suitable primer layer. Corona discharge treatment is a preferred means for adhesion promotion. The antistatic layer may also be applied over an adhesion promoting primer layer of an interpolymer of a primary amine addition salt, as disclosed in U.S. Pat. No. 6,120,979.

Typically to minimize surface charge buildup, it is desirable to have the antistatic layer as an outer surface. This provides for faster charge decay or bleed-off of the charge so as to minimize the chance of static discharge. In developing displays with electrically modulating imaging layers, it may be desirable to have an outer layer that has a different functionality other than antistatic protection. Such functional layers require a minimum amount of material in order to provide optimal functionality. Such layers may be a mixture or dispersion of several materials but typically there may be a limitation of how much material can be put in a given layer. For example, in the case of an antistatic layer, trying to incorporate other functional properties can be done but may result in tradeoffs in the final layer conductivity. In one embodiment, the antistatic layer is located between the functional layer and the substrate. In another embodiment, the functional layer is located between the antistatic layer and the substrate.

In another example, antiglare or antireflection layers are surface dependant and it may be difficult to make the layer sufficiently conductive for high-speed coating or finishing operations during the manufacturing of display substrates. In such a case, it may be desirable to have a primary antistatic layer below the outer antireflection layer. If this is the case, it is desirable to make the antiglare layer very thin or perhaps very slightly conductive to allow any charge built up on the substrate to percolate to the antireflection outer surface and discharge to ground before it builds to the point of discharge that can result in unwanted switching of the liquid crystal. Additionally it should be mentioned that when a conductive layer is buried under an electrically insulating layer, and two or more sheets are stacked on top of one another and there is some movement between the substrates, there may be sufficient residual charge to create static cling between the sheets. In one such embodiment of this invention where an antistatic layer is buried under an outer electrically insulating layer, the outer functional layer provides a means to minimize static cling. In a further embodiment, the functional layer has a resistivity between $10^5$ to $10^{14}$ ohms per square. In a preferred embodiment of this invention functional layer has a surface resistivity of is between $10^{11}$ and $10^{13}$ ohms per square. Such layers may contain low levels of antistatic materials or may be ionically conducting. Since there is a means to transport electrical charge between the outer-most layer and the antistatic layer, problems such as static cling, can be minimized as well as providing a means to improve production rates without excessive static buildup in the substrate. In another embodiment of this invention, where the functional layer forms an outer surface, such a layer has a surface roughness of between 7 and 35 microns.

The display may be stacked to provide a multilayer display. For example, a second display of a second substrate having a second electrically modulated imaging layer thereon, a second patterned electrically conductive layer, and a second antistatic layer may be laminated to the original display. This may be repeated to provide a multilayer display with many display units laminated together. In the case of multilayer displays, the substrates located between the viewing side of said display and the non-viewing side of said display should be transparent or at least translucent substrates. Multilayer displays may be used to produce displays capable of producing full color or multi-color images. In one embodiment, each display unit may contain different colored electrically modulated imaging layers. More than one colored imaging layer may also be untilized within a single display unit.

The displays may be manufactured by providing a substrate, applying at least one electrically conductive layer to the substrate, patterning the electrically conductive layer or layers, applying at least one electrically modulated imaging layer; and applying at least one antistatic layer. Additional functional layers may be applied at various points in the manufacture, for example, prior to said patterning said at least one electronically conductive layer. In addition, multiple display units may be manufactured, either by simultaneous or sequential application. In preferred embodiments, two or three display units are manufactured to provide a single multilayer, multicolor display.

Another means of minimizing static cling between display sheets is to provide a slightly roughened outer surface. Additionally it may be useful to control the outer layer thickness. Typically, thinner layers are better for charge dissipation than thicker layer because thinner layers of a given material will provide faster charge migration than thicker materials of the same chemical composition.

The following examples are provided to illustrate the invention.

EXAMPLE 1 (CONTROL)

A liquid crystal display was prepared as follows: A 125 micron polyethylene terephthalate substrate was coated with a layer of ITO (300 ohm per square resistivity) forming the first electrode (conductive layer) on one side of the substrate. The ITO was laser etched with thin lines to electrically separate rows in the first electrode with each row corresponding to an individual character in the display. An imageable layer containing gelatin and droplets of cholesteric liquid crystal was coated on the ITO layer. A color contrasting black layer containing gelatin and cyan, magenta, yellow, and black pigments was coated on the imageable layer. Thin bands of the two coated layers were removed along an edge of the display perpendicular to the laser etch lines. This exposed the ITO along the edge of the display to allow electrical contact to the first electrode.

EXAMPLE 2 (INVENTION)

A liquid crystal display was prepared as follows: A 125 micron polyethylene terephthalate substrate was coated with a layer of ITO (300 ohm per square resistively) forming the first electrode on one side of the substrate and a transparent antistatic layer was coated on the side opposite the ITO layer. The ITO was laser etched with thin lines to electrically separate rows in the first electrode. Each row corresponds to an individual character in the display. The transparent antistatic layer was formed by coating an aqueous composition comprising a binder and a conductive antistatic agent with a weight ratio of 40:60, resulting in a layer with resistivity of $1.6 \times 10^{10}$ log ohms per square. Polyethyleneimine (such as Mica A-131-X, supplied by the Mica Corporation) was used as the polymeric binder, and a cross-linked vinylbenzyl quaternary ammonium polymer is used as the conductive antistatic agent. An imageable layer containing gelatin and droplets of cholesteric liquid crystal is coated on the ITO layer. A color contrasting black layer containing gelatin and cyan, magenta, yellow, and black pigments was coated on the imageable layer. Thin bands of the two coated layers were removed along on an edge of the display perpendicular to the laser etch lines. This exposed the ITO along the edge of the display to allow electrical contact to the first conductive layer.

EXAMPLE 3 (INVENTIVE) (SINGLE LAYER COATING OF UV ABSORBER AND ANTISTATS)

Coating solution A (preparation described below) was coated on bare 4 mil poly(ethylene terephthalate) (PET) film substrate at 2.0 cc/ft$^2$ wet coverage to obtain a layer of approximately 2.4 μm thick. Corona discharge treatment at 100 jouls/ft$^2$ was applied to the coating surface of PET film prior to coating to improve adhesion. The ITO side of the substrate was laser etched with a series parallel line with the laser etching the ITO in a continuous connected line.

Coating solution A (all refers to weight percentage of active ingredient in final solution)
- 0.3125% polythiophene (active ingredient of Baytron P, available from Bayer)
- 5.9375% polyurethane (Sancure 898, available from Noveon)
- 5.00% UV latex
- 0.5% CX-100 (polyurethane crosslinking agent, which is a polyfunctional aziridine crosslinker for the polyurethane-acrylic copolymer dispersion, obtained from Neo Resins (a division of Avecia)
- 0.2% high density polyethylene wax (Jonwax 26, available from S.C. Johnston Polymer)
- 0.2% Carnauba wax (Michem Lube 160, from Michelman, Inc.)
- 0.1% Zonyl FS-62 (fluorinated surfactant, available from DuPont)

UV latex is a polymer prepared by the method for preparing P-27, described in U.S. Pat. No. 5,384,235 (column 22, line 52 to column 23, line 3), using the following monomers at weight ratio of 74.3:23.0:2.7.

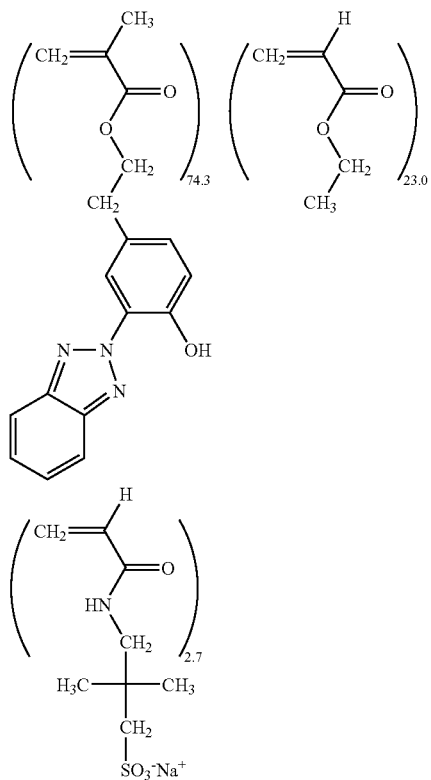

Synthesis of UV Latex Polymer

A 250 ml 4-neck round bottom flask equipped with a mechanical stirrer, nitrogen inlet, and condenser was immersed in a constant temperature bath at 80 C. A monomer solution comprising 6.46 g of M-1, 5,127 g of n-butyl acrylate, 0.92 g of 2-acrylamido-2-methyl- propane sulfonic acid(sodium salt), 0.25 g of 2,2'-azobis(2-methylpropionitrile), and 50 ml of N,N-dimethylforamide was added into the reactor over 4 hours. 0.125 g of 2,2'-azobis(2-methylpropionitrile) in 2 ml of DMF was post-added and polymerized for two more hours. The polymer solution was diluted with 50 ml of methanol and dispersed in 200 ml of hot distilled water. The latex obtained was cooled, filtered and dialyzed against distilled water overnight. The latex was then concentrated to 5.6% solid with Amicon's Ultrafiltration unit. The Z-average particle size measured by Malvern's Autosizer IIC was 55.0 nm. The elemental analysis results were N (7.1%), C (64.1%), and H (7.0%). Glass transition temperature (determined by differential scanning calorimetry (DSC), using a ramping rate of 20° C./minute, defined herein as the inflection point of the glass transition) is 94 C.

EXAMPLE 4 (INVENTIVE) 2-LAYER COATING OF ANTISTATS BOTTOM LAYER AND UV TOP LAYER

Coating solutions B & C were applied to bare 4 mil PET film substrate sequentially. Solution B (preparation described below) was applied first directly to PET surface at 1.5 cc/ft$^2$ and dried to obtained a layer of approximately 0.3 μm thick, followed by the application of solution C (preparation described below) at 2.0 cc/ft$^2$ directly onto the drydown surface of Solution B to obtain a layer of 2.5 μm thick. The PET substrate had etched ITO on the opposite side as described in example 3.

Coating solution B (all refers to weight percentage of active ingredient in final solution)
  0.1% polythiophene (active ingredient of Baytron P, available form HC Starck Company)
  1.9% polyurethane (Sancure 898, available from Noveon)
  0.05% Olin 10 G (coating aid, available from Olin)

Coating solution C (all refers to weight percentage of active ingredient in final solution)
  7.500% polyurethane (Sancure 898, available from Noveon)
  0.5% CX-100
  5.00% UV latex
  0.2% high-density polyethylene wax (Jonwax 26, available from S.C. Johnston Polymer)
  0.2% Carnauba wax (Michem Lube 160, from Michelman, Inc.)
  0.1% Zonyl FS-62 (fluorinated surfactant, available from DuPont)

EXAMPLE 5 (INVENTIVE) 2-LAYER COATING OF ANTISTATIC BOTTOM LAYER AND UV TOP LAYER

Sample 5 was prepared very similar to sample 4, except solution D (preparation described below) was used in place of solution B.

Coating solution D (all refers to weight percentage of active ingredient in final solution)
  1.2% Tin oxide (active ingredient FS 10D, available from Ishihara Techno Corp.)
  0.8% polyurethane (Sancure 898, available from Noveon)
  0.05% Olin 10G (coating aid/surfactant, available from Olin)

SAMPLE 6 (INVENTIVE) 2-LAYER COATING OF UV BOTTOM LAYER AND ANTISTATIC TOP LAYER

Coating solutions E & F were applied to the bare side of 4 mil PET film substrate sequentially. The opposite side of the PET had etched ITO as described above. Solution E (preparation described below) was applied first directly to PET surface at 2.0 cc/ft$^2$ and dried to obtained a layer of approximately 2 μm thick, followed by the application of solution F (preparation described below) at 1.0 cc/ft$^2$ directly on to the dry-down surface of Solution B to obtain a layer of 0.3 μm thick.

Coating solution E (all refers to weight percentage of active ingredient in final solution)
  5.00% polyurethane (Sancure 898, available from Noveon)
  0.5% CX-100
  5.00% UV latex (as used in Solution C)
  0.01% Hostapal BV (coating aid, available from Clariant)

Coating solution F (all refers to weight percentage of active ingredient in final solution)
- 0.15% polythiophene (active ingredient of Baytron P)
- 2.85% polyurethane (Sancure 898, available from Noveon)
- 0.1% high density polyethylene wax (Jonwax 26, available from S.C. Johnston Polymer)
- 0.15% Zonyl FS-62 (fluorinated surfactant, available from DuPont)

To demonstrate the benefit of using an antistatic coating on a cholesteric liquid crystal web, two polymeric substrates as describe in example 1 (without an antistat) and 2 (with an antistat), were made using the same polyester substrate and the same cholesteric liquid crystal. In example 1 the substrate did not have an antistatic layers or properties and example 2 had an antistatic coating on the side opposite of the liquid crystal side. The antistatic coating produced a significant reduction in the surface electrical resistivity on the surface of the side opposite of the liquid crystal in example 2 when compared to the side opposite of the liquid crystal on example 1 that did not have any antistatic protection. Example 1 was measured at about $1 \times 10^{15}$ ohms/square and example 2 was measured at about $1 \times 10^{9}$ ohms/square. Both webs were used in a series of tests to evaluate their charge decay, charge accumulation, and marking performance or point source switching of the liquid crystal as a function of surface charge buildup on the substrate.

The first experiment consisted of measuring the rate of charge decay from example 1 and example 2 while in sheet form. A piece was cut from each web and tested in the following manner. Each piece of web was placed on an electrically grounded vacuum platen with liquid crystal side against the platen. Vacuum was applied to hold the sheet flat against the platen. In addition, a small piece of metal with a wire connecting it to ground was placed on the surface of the sheet, near the edge of the sheet, to provide a possible leakage path to ground. A uniform charge was applied to the side of the substrate opposite the liquid crystal by slowly passing a high voltage ionizer over the surface at a fixed close spacing to the sheet. Immediately after the ionizer was passed over the surface, a non-contacting electrostatic voltmeter probe was moved to a position over the center of the sheet to measure the surface voltage at that location. The output of the electrostatic voltmeter was recorded with a data logger. Example 1, with no antistatic coating, had a surface potential of approximately 1500 volts that showed zero charge decay in 10 minutes. Example 2, having the antistatic coating, showed rapid charge decay so that its surface potential dropped to zero voltage in about 3 minutes. This demonstrated that the antistatic coating on example 2 produced significant improvement in charge decay.

The second experiment demonstrated the difference in charge accumulation between examples 1 and 2, due to unwinding and conveyance over rollers. Each web was alternately placed on a rewinder. Each example was unwound, conveyed over 24 rollers (23 grounded metal rollers and one polyurethane drive roller) and rewound at the other end of the machine at a speed of 50 fpm. During this process, the surface voltage on the side opposite the liquid crystal layer of each web was measured at roller 1, the first roller in the machine, and roller 22, the $22^{nd}$ roller in the machine, using a non-contacting electrostatic voltmeter at each location. The data was recorded with a data logger measuring at 100 samples per second. Example 1 had an average surface voltage of 107.8 volts at roller 1 with a standard deviation of 44.0 volts and averaged 86.8 volts at roller 22 with a standard deviation of 35.7 volts. Example 2 had an average zero volts with a standard deviation of zero at both roller locations for the same test. This indicates that the antistatic coating on side opposite the liquid crystal layer of example 2 was effectively holding that surface at ground potential as it was unwound and conveyed over the rollers, preventing charge accumulation.

A third experiment demonstrated the reduction in point source switching to the cholesteric liquid crystal provided by the addition of an antistatic layer. This trial required slitting examples 1 and 2 into narrow webs that had non-connected sections of ITO. In producing examples 1 and 2, prior to coating them with cholesteric liquid crystal material, the side to be coated with the liquid crystal was coated with a vacuum deposited ITO layer applied to the entire surface. The ITO layer had been scribed using an UV excimer laser with straight scribe lines that were perpendicular to the direction of web travel. Each scribe line cut through the ITO layer and extended across the width of the web to a point about ¼ inch from each edge. Since the scribe lines did not extend to the full width of the web, they did not create non-connected sections of ITO. However, if the web were slit longitudinally into several narrow slits, the slits that did not contain the outside ¼ inch of web would have scribe lines running across their entire width, making their ITO coating into non-connected segments. This would make these particular slits susceptible to damage from electrostatic charge since charge could not move along the length of the web.

The third experiment consisted of measuring the charge on the side of the substrate of examples 1 and 2 during the process of slitting each of them longitudinally and examining the subsequent narrow slits for electrostatic induced switching of the liquid crystal light modulating layer. This test was conducted on a slitter that unwound each web, conveyed it over several grounded metal rollers to the slitter knives and then conveyed the individual slits over several other rollers to separate windups. A non-contacting electrostatic voltmeter was mounted on the machine to measure the voltage on the side opposite the liquid crystal at a roller before the slitting knives.

Small rolls of example 1 and 2 were slit on the machine at 50 fpm. The two webs were handled identically. During the slitting, the voltage on example 1 varied from 140 to 440 volts whereas the voltage on example 2 varied from −28 to +30 volts over the same length. After slitting, one slit from each roll was examined for electrostatic induced point source switching of the liquid crystal. The switching was an irreversible change in the liquid crystal phase that occurred adjacent to a scribe mark in the ITO etched line. Example 1 had switches at 5 of the 11 scribe marks, whereas example 2 showed no switches at any of the 11 scribe marks. This demonstrated that the antistatic coating on example 2 prevented the voltage on the side opposite of the liquid crystal from reaching a point that would cause switching to the liquid crystal. The results are tabulated in Table 1.

TABLE 1

| Example | Surface Resistivity (Ohms/Sq) | Water Electrode Resistivity (Ohms/sq) | Exp 1 Charge Decay- Volts/Time | Exp 2 Conveyance Charging @ 50 ft/min (Volts) | Exp 3 Slitting Charge @ 50 ft/min (Volts) | Exp 4 % Static Induced Switches |
|---|---|---|---|---|---|---|
| 1 (control) | $10^{15}$ | $10^{12}$ | 1500 V after 10 minutes | 86.8 | 140–440 | 45% |
| 2 (invention) | $10^{9}$ | $10^{8}$ | 0 after 3 minutes | 0 | −28 to +30 | 0 |
| 3 (invention) | $10^{12}$ | $10^{10}$ | 36 V after 1.28 minutes | −19.2 | −160 to −220 | 0 |
| 4 (invention) | $10^{12}$ | $10^{9}$ | 22 V after 1.22 minutes | −37.4 | −12 to −20 | 0 |
| 5 (invention) | $10^{8}$ | $10^{8}$ | 0 after 0.067 seconds | −3.2 | +4 to +18 | 0 |
| 6 (invention) | $10^{8}$ | $10^{8}$ | 0 after 5.2 sec | DNE* | DNE* | DNE* |

*DNE means Did Not Evaluate

As can be seen from the data presented in Table 1, the control sample 1 that did not have any antistatic layer on the side of the substrate opposite of the ITO/liquid crystal layers had a much slower charge decay rate than examples 2, 3, 4, 5, and 6. Samples 2, 3 and 4 had the antistatic layer under a separate functional UV layer; sample 5 had the antistatic layer on the outer surface opposite of the ITO/liquid crystal layers. Sample 6 had both the antistatic and UV absorbing functionality in the same layer. As can be seen from the charge decay data, samples 5 and 6 were able to dissipate all charge within seconds, while samples 2, 3 and 4 required minutes to fully dissipate and the control sample (sample 1) still had high residual charge even after 10 minutes. The data from this table also indicates that even samples with relatively high surface resistivity $10^{12}$ ohms/square were effective in preventing static switching.

Table 1 includes resistivity measurements that were taken using the water electrode method. When an antistatic layer is buried under a less conducting layer often it is difficult to measure the surface resistivity using traditional surface resistivity measurements due to variability in the measurement caused by the higher resistivity top coat. In this measurement, a sample of the substrate is cut into a rectangular strip of width A and length B, where B is much longer than A. One end of the strip is placed into a small pool of salt water in another metal electrode. The water makes intimate electrical contact with all the layers on the substrate. Voltage applied from the one electrode to the other will cause current to flow through the sample and from the measure of this current, the voltage, and the dimensions A and B, the equivalent electrical resistivity can be calculated.

In Table 1, the data from this measurement indicates samples should have a volume resistivity of at least than $10^{10}$ log ohms/square or lower. Control sample 1, which had water electrode resistivity of $10^{12}$ log ohms/square had approximately 45% static induced switches in the liquid crystal layer and very long decay time, while samples 2–5 which had lower resistivities had no static induced switches and much shorter decay times. Although not evaluated, Sample 6 is expected to have the same results as samples 2–5 because it has similar surface and water electrode resistivity as well as a quick charge decay rate.

Additionally the data in Table 1 indicates that the webs with the antistatic layer either on the outer surface or buried under another functional layer had minimal charging during conveyance and slitting evaluation.

The invention has been described in detail with particular reference to certain preferred embodiments thereof, but it will be understood that variations and modifications can be effected within the spirit and scope of the invention.

The invention claimed is:

1. A display comprising at least one substrate having at least one electrically modulated imaging layer thereon, at least one patterned electrically conductive layer, and at least one antistatic layer on the side of said substrate opposite said electrically modulated imaging layer, wherein said display is a reflective display.

2. The display of claim 1 wherein said at least one substrate comprises a flexible transparent substrate.

3. The display of claim 2 wherein said transparent substrate comprises polyester.

4. The display of claim 2 wherein said transparent substrate comprises polycarbonate.

5. The display of claim 2 wherein said transparent substrate comprises acetate.

6. The display of claim 2 wherein said transparent substrate comprises at least one member selected from the group consisting of polyolefin, polyester, polycarbonate, acetate, cyclic olefin, polyethersulfone, and polyamide.

7. The article of claim 1 wherein said substrate comprises oriented laminates.

8. The display of claim 1 wherein said electrically modulated imaging layer comprises a light modulating material.

9. The display of claim 8 wherein said light modulating material comprises a liquid crystal material.

10. The display of claim 9 wherein said liquid crystal material is a chiral nematic liquid crystal material.

11. The display of claim 9 wherein said liquid crystal material is a polymer dispersed chiral nematic liquid crystal layer.

12. The display of claim 11 wherein said polymer is gelatin.

13. The display of claim 11 wherein said polymer is water-soluble.

14. The display of claim 1 wherein said conductive layer comprises ITO.

15. The display of claim 1 wherein said conductive layer comprises at least one polyether polymeric conductive material.

16. The display of claim 15 wherein said polyether polymeric conductive material comprises polyether block copolyamide.

17. The display of claim 1 wherein said electrically conductive layer comprises a transparent conductive material.

18. The display of claim 17 wherein said transparent conductive material is substantially transparent to radiation of wavelengths from 300 to 850 nm.

19. The display of claim 1 wherein said conductive layer has a surface electrical resistivity of less than 104 ohms/sq, sufficient to switch the state of the electrically modulated material.

20. The display of claim 19 wherein said conductive layer has a surface electrical resistivity of less than 300 ohms/sq.

21. The display of claim 1 further comprising at least a second electrically conductive layer.

22. The display of claim 1 wherein said antistatic layer has a surface resistivity of between 105 and 1012 ohms/sq.

23. The display of claim 1 wherein said at least one antistatic layer is a transparent layer.

24. The display of claim 1 wherein said antistatic layer is patterned to form a continuous conductive pathway.

25. The display of claim 1 wherein said antistatic layer has a surface resistivity of between 104 and 1012 ohms/sq and is not capable of switching said electrically modulated layer.

26. The display of claim 1 wherein said antistatic layer comprises at least one electrically conductive antistatic material.

27. The display of claim 26 wherein said electrically conductive antistatic material comprises metal-containing particles.

28. The display of claim 27 wherein said metal-containing particles are acicular.

29. The display of claim 27 wherein said metal-containing particles comprise semiconducting metal oxides.

30. The display of claim 27 wherein said metal-containing particles comprise conductive crystalline inorganic oxides.

31. The display of claim 30 wherein said metal-containing particles comprise tin oxide.

32. The display of claim 27 wherein said metal-containing particles comprise conductive metal antimonates.

33. The display of claim 27 wherein said metal-containing particles comprise conductive inorganic non-oxides.

34. The display of claim 26 wherein said electrically conductive antistatic material comprises electronically conductive polymers.

35. The display of claim 34 wherein said electronically conductive polymers comprise polythiophenes, polypyrroles, and polyanilines.

36. The display of claim 1 wherein said antistatic layer comprises at least one ionic conductor.

37. The display of claim 36 wherein said ionic conductor is an inorganic and/or organic salt.

38. The display of claim 36 wherein said ionic conductor is a conductive clay.

39. The display of claim 36 wherein said ionic conductor is a surfactant capable of static dissipation.

40. The display of claim 39 wherein said surfactant is an alkyl sulfates, alkyl sulfonates and alkyl phosphates having alkyl chains of 4 or more carbon atoms in length.

41. The display of claim 39 wherein said surfactant is an onium salt, having alkyl chains of 4 or more carbon atoms in length.

42. The display of claim 39 wherein said surfactant is polyvinyl alcohol, polyvinylpyrrolidone, polyether, amine, acids and fatty acid esters having alkyl groups of 4 or more carbon atoms in length.

43. The display of claim 1 wherein said antistatic layer comprises a carrier material.

44. The display of claim 43 wherein said carrier material comprises a polymer.

45. The display of claim 44 wherein said conductive antistatic material comprises from 15 to 85% weight of said antistatic layer, and said polymer comprises from 15 to 85% by weight of said antistatic layer.

46. The display of claim 44 wherein said polymer comprises polypropylene.

47. The display of claim 44 wherein said polymer comprises polyethylene.

48. The display of claim 44 wherein said polymer comprises polyurethane.

49. The display of claim 44 wherein said polymer comprises polymers and interpolymers selected from the group of polymers and interpolymers prepared from monomers selected from the group consisting of styrene, styrene derivatives, acrylic acid, acrylic acid derivatives, methacrylic acid, methacrylic acid derivatives, olefins, chlorinated olefins, acrylonitriles, methacrylonitriles, itaconic acid, itaconic acid derivatives, maleic acid, maleic acid derivatives, vinyl halides, vinylidene halides, vinyl monomer having a primary amine addition salt, and vinyl monomer containing an aminostyrene addition salt.

50. The display of claim 44 wherein said polymer comprises styrene and styrene derivates, acrylics and acrylic acid derivatives, methacrylic acid and methacrylic acid derivatives.

51. The display of claim 44 wherein said polymer comprises polyester.

52. The display of claim 1 wherein said at least one antistatic layer is on the side of the substrate opposite said at least one electrically conducting layer.

53. The display of claim 1 wherein said at least one antistatic layer comprises at least two separate antistatic layers.

54. The display of claim 53 wherein said two separate antistatic layers comprise different compositions.

55. The display of claim 53 wherein said at least two separate antistatic layers are adjacent layers.

56. The display of claim 53 wherein one of said at least two separate antistatic layers is an outermost layer.

57. The display of claim 56 wherein said antistatic layer has a surface resistivity of from 1011 to 1013.

58. The display of claim 57 wherein said antistatic layer has a surface roughness of from 7 to 35 microns.

59. The display of claim 1 wherein said antistatic layer has a volume resistivity taken using the water electrode method of at least 1010 log ohms/square or lower.

60. The display of claim 1 wherein said at least one antistatic layer is index matched to a layer adjacent to said at least one antistatic layer.

61. The display of claim 1 further comprising at least one functional layer.

62. The display of claim 61 wherein said functional layer comprises a UV absorbing material.

63. The display of claim 61 wherein said functional layer is on a side of said substrate with said antistatic layer.

64. The display of claim 61 wherein said functional layer is an environmental protection layer.

65. The display of claim 61 wherein said functional layer provides anti-reflection or antiglare.

66. The display of claim 1 further comprising a second display laminated thereto, wherein said second display comprises at least one second substrate having at least one second electrically modulated imaging layer thereon, at least one second patterned electrically conductive layer, and at least one second antistatic layer, wherein those substrates located between the viewing side of said display and the nonviewing side of said display are transparent substrates.

67. The display of claim 66 wherein said electrically modulated imaging layer are different colored electrically modulated imaging layers.

68. A method of manufacturing a display comprising providing a substrate; applying at least one electrically conductive layer; patterning said at least one electrically conductive layer; applying at least one electrically modulated imaging layer; and applying at least one antistatic layer on the side of said substrate opposite said electrically modulated imaging layer, wherein said display is a reflective display.

69. The method of claim 68 further comprising applying a functional layer.

70. The display of claim 68 wherein said applying at least one antistatic layer is prior to said patterning said at least one electronically conductive layer.

71. The method of claim 68 further comprising providing a second substrate; applying at least one second electrically conductive layer; patterning said at least one second electrically conductive layer; applying at least one second electrically modulated imaging layer; applying at least one second antistatic layer to form a second display; and laminating said second display to said display.

72. The method of claim 71 further comprising providing a third substrate; applying at least one third electrically conductive layer; patterning said at least one third electrically conductive layer; applying at least one third electrically modulated imaging layer; applying at least one third antistatic layer to form a third display; and laminating said third display to said second display and said display.

* * * * *